(12) United States Patent
Hori

(10) Patent No.: US 6,873,374 B2
(45) Date of Patent: Mar. 29, 2005

(54) SHIELDING APPARATUS OF PROJECTION TELEVISION

(75) Inventor: Masatoshi Hori, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 588 days.

(21) Appl. No.: 09/960,378

(22) Filed: Sep. 24, 2001

(65) Prior Publication Data

US 2002/0036722 A1 Mar. 28, 2002

(30) Foreign Application Priority Data

Sep. 25, 2000 (JP) ........................................ 2000-290371

(51) Int. Cl.[7] ................................................ H04N 5/64
(52) U.S. Cl. ........................ 348/787; 348/789; 348/836
(58) Field of Search ................................ 348/744, 787, 348/789, 841, 842, 836, 776, 786, 794, 818, 819, 820, 823, 832, 834, 748; 312/7.2, 223.1, 223.2, 223.6; 248/917, 918; 349/58, 59; H04N 5/64, 5/74

(56) References Cited

U.S. PATENT DOCUMENTS 6,157,417 A * 12/2000 Cho ............................ 348/836
6,233,026 B1 * 5/2001 Kim et al. ................... 348/836

FOREIGN PATENT DOCUMENTS

| JP | 05-130541 | 5/1993 |
| JP | 07135626 | 5/1995 |
| JP | 07-183684 | 7/1995 |
| JP | 2000196977 | 7/2000 |
| JP | 2000209525 | 7/2000 |

* cited by examiner

Primary Examiner—Sherrie Hsia
(74) Attorney, Agent, or Firm—Wenderoth, Lind & Ponack, L.L.P.

(57) ABSTRACT

A shielding apparatus of projection television is disclosed. A metal shield casing made of metal plate members shields an optical block and a circuit block. Metal plate printed board holding sections are connected to the metal shield casing detachably at predetermined intervals, and hold the printed board. Connection sections of the metal shield casing elastically contact with the printed board holding section, and connect so as to conduct electrically with the metal shield casing. Further, a part of the metal plate casing of the printed board holding section is elastically fixed to the metal shield casing through the connection section, and shields the optical block and circuit block. Thus, the shield casing excellent in shielding effect of high frequency circuit and easy in servicing is presented.

15 Claims, 48 Drawing Sheets

SHIELDING APPARATUS OF PROJECTION TELEVISION

FIELD OF THE INVENTION

The present invention relates to an electromagnetic shielding apparatus of projection television including an optical block and a circuit block.

BACKGROUND OF THE INVENTION

Hitherto, as a structure for constituting a casing of projection television, an example disclosed in Japanese Laid-open Patent No. 5-130541 has been known. In this disclosed projection television, a cathode-ray tube (CRT) and a circuit board compose a CRT block. This CRT block can be separated from the mirror, screen, and cabinet. Thus, the CRT block can be mounted easily on the cabinet.

As an electromagnetic impedance countermeasure structure of electronic appliance, an example is disclosed in Japanese Laid-open Patent No. 7-183684. In the disclosed structure of shield plate, both sides of a shield plate having a conductor are fixed inside of an upper case by a pi-shaped protrusion provided inside of the upper case. Further, the shield plate, lower case, and grounding terminal of printed board of logic circuit are fastened with screw at the same position. Thus, the shield structure capable of preventing effects of static electricity or noise is obtained.

Recently, as the frequency is becoming higher in integrated circuit (IC) board of circuit unit, resistance to electromagnetic impedance is further demanded in projection television and other electronic appliances. It is hence more and more needed to reinforce the shield by metal casing or the like. On the other hand, as the screw tightening portions and shielding components are increasing in number, service tends to be more and more difficult.

In the case of projection television, further, even an optical clearance may cause to lower the electromagnetic shielding performance or pass undesired reflected light.

SUMMARY OF THE INVENTION

The present invention addresses the problems discussed above, and, it is an object of the invention to present a shielding apparatus capable of realizing a shield casing for shielding the electromagnetic waves causing interference in a structure requiring only a small number of screws, and servicing easily.

In a shielding apparatus of projection television of the invention containing an optical block, and a circuit block including a printed board on which an electric circuit components are mounted, a metal shield casing composed of metal plate members accommodates and shields the optical block and circuit block.

A printed board holding section made of metal plate is detachable fixed to the metal shield casing at a predetermined interval, and hold the printed board.

A connection section is provided in the metal shield casing so as to snap in and conduct electrically the printed board holding section.

One side of the metal plate casing of the printed board holding section is fixed to contact elastically with the metal shield casing through the connection section, and shields the optical block and circuit block.

More specifically, the mounting holes provided in the metal plate members positioned at the lower side of the printed board holding parts provided in the printed wiring board contact elastically with the ungula-shape-portions of the shield casing for electromagnetic interference countermeasure. Thus, the printed board holding parts electrically conduct with the shield casing to form a part of the shield casing.

DESCRIPTION OF THE PREFERRED EMBODIMENTS

Preferred embodiments of the invention are described below while referring to FIG. 1 through FIG. 48.

(Embodiment 1)

Figure 1:
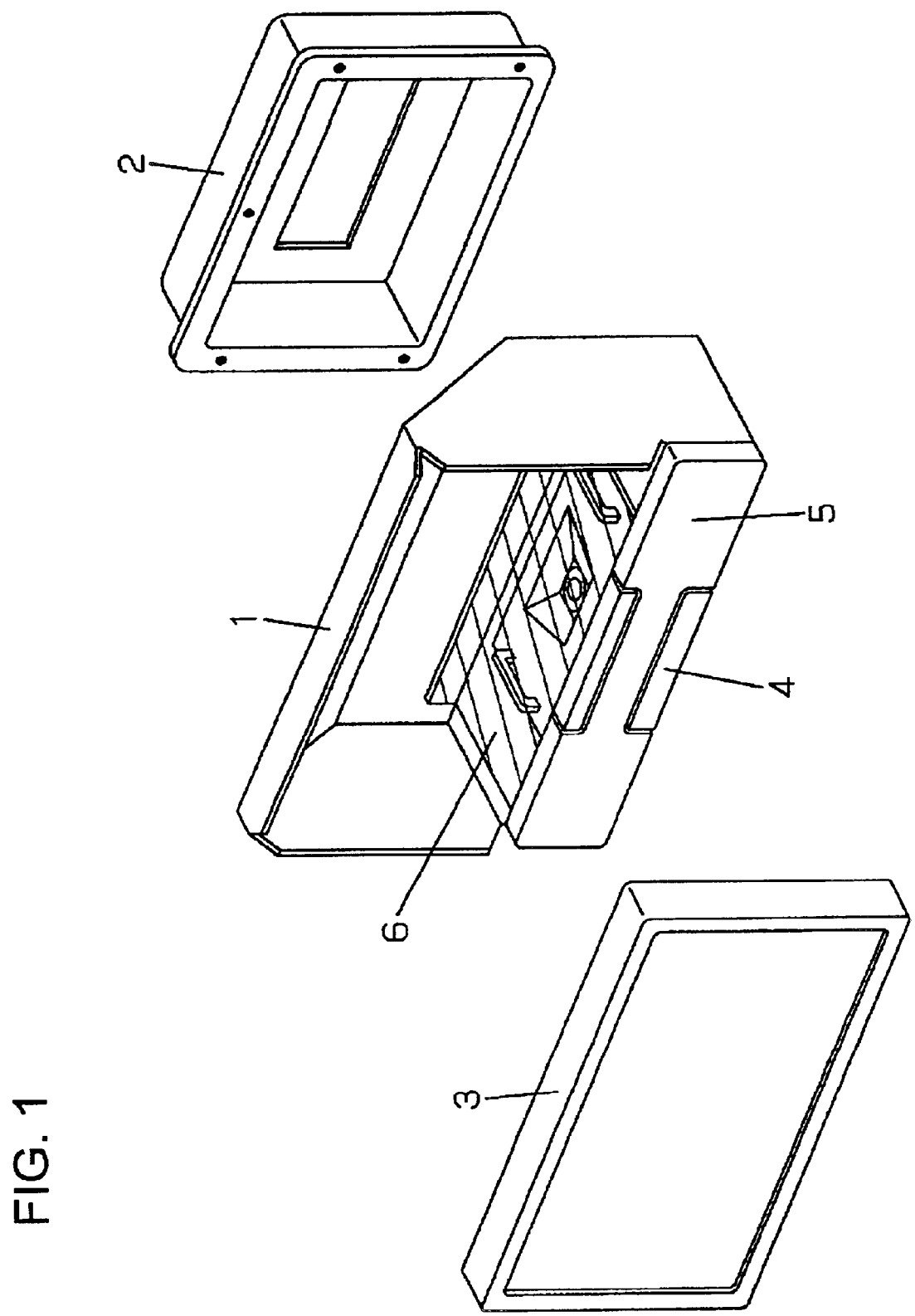
FIG. 1 is a conceptual perspective view of outside configuration of television receiver mounting a circuit unit of the invention.

FIG. 1 is a conceptual perspective view of outline of projection television receiver mounting a shield unit and a circuit unit of the invention.

Figure 2:
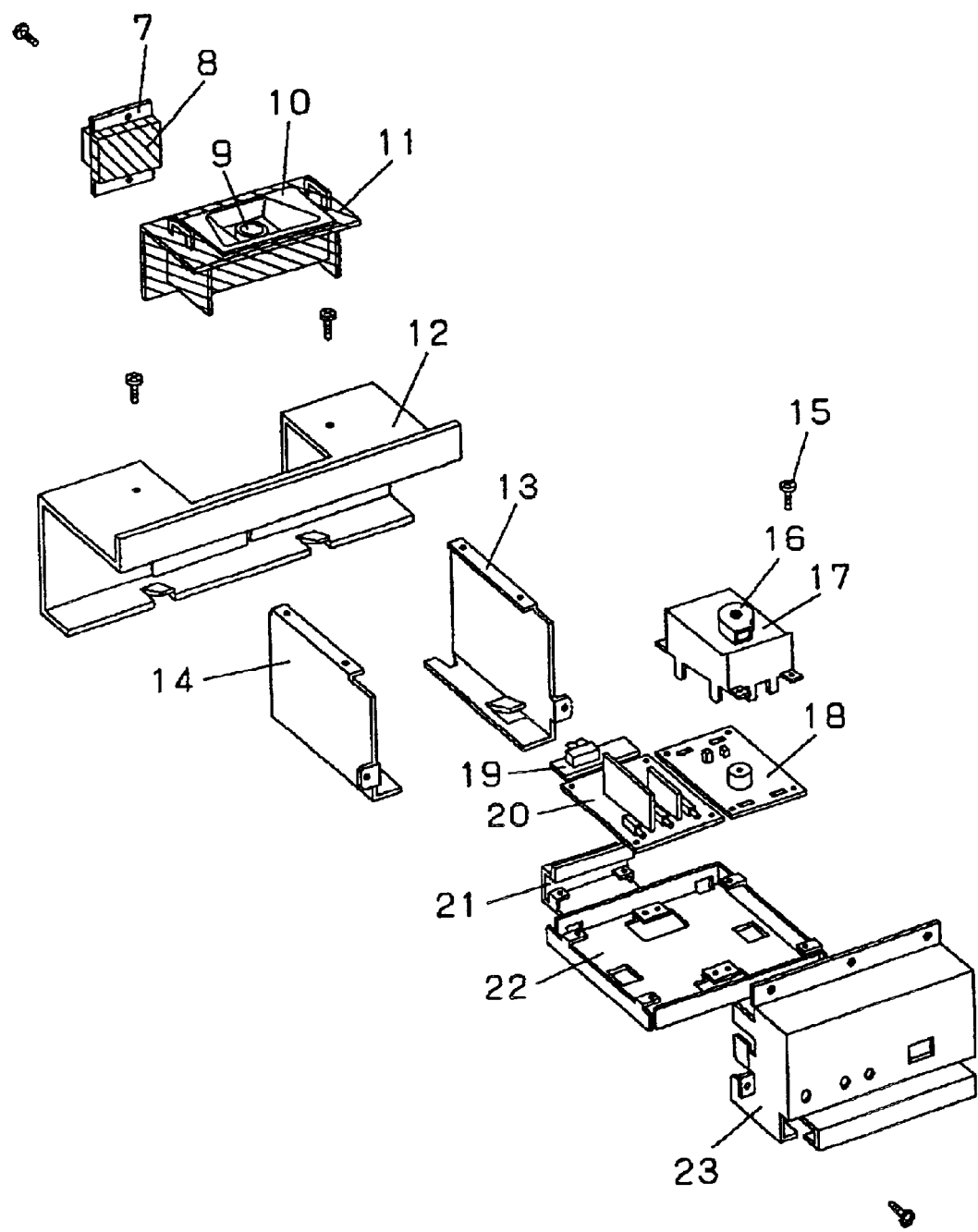
FIG. 2 is a conceptual perspective view of inside configuration of television receiver mounting a circuit unit of the invention.

FIG. 2 is a conceptual perspective view of inside configuration of television receiver mounting a shield unit and a circuit unit of the invention.

Figure 3:
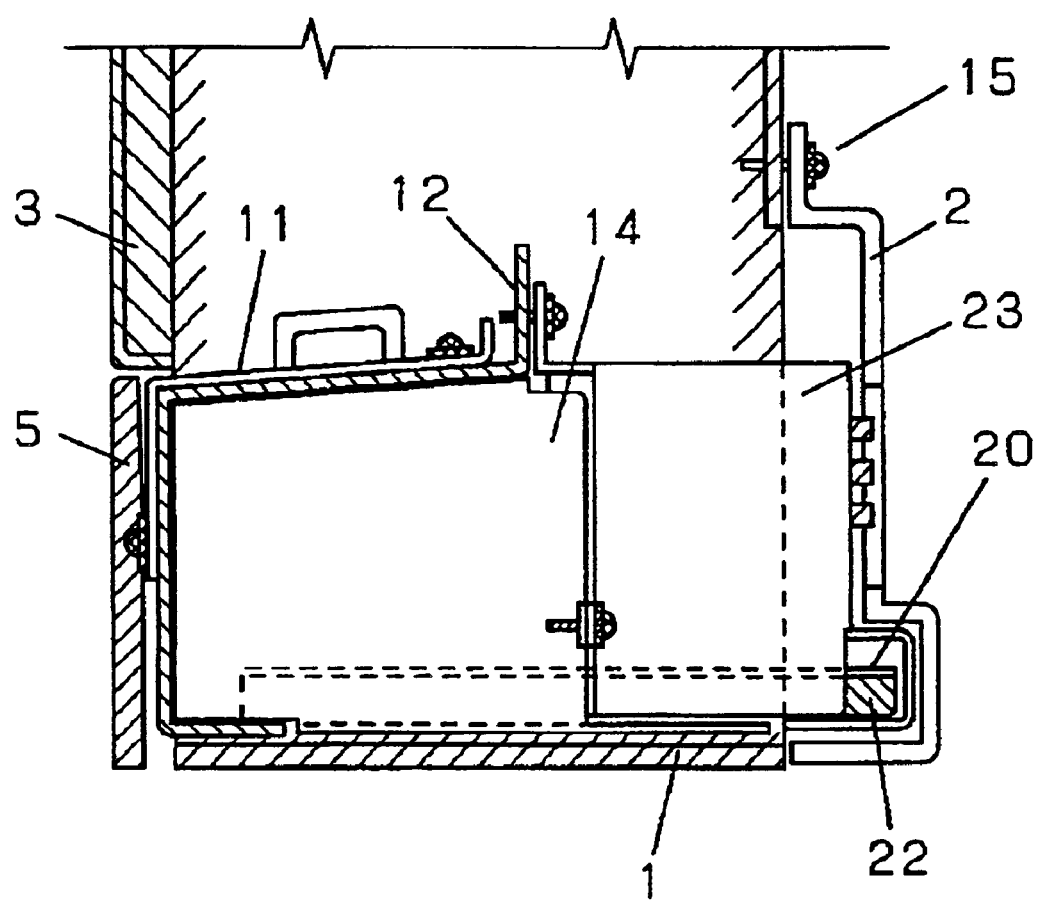
FIG. 3 is a side view after assembly of shield unit of the invention.

FIG. 3 is a side view after assembly of shield unit in an embodiment of the invention.

Figure 4:
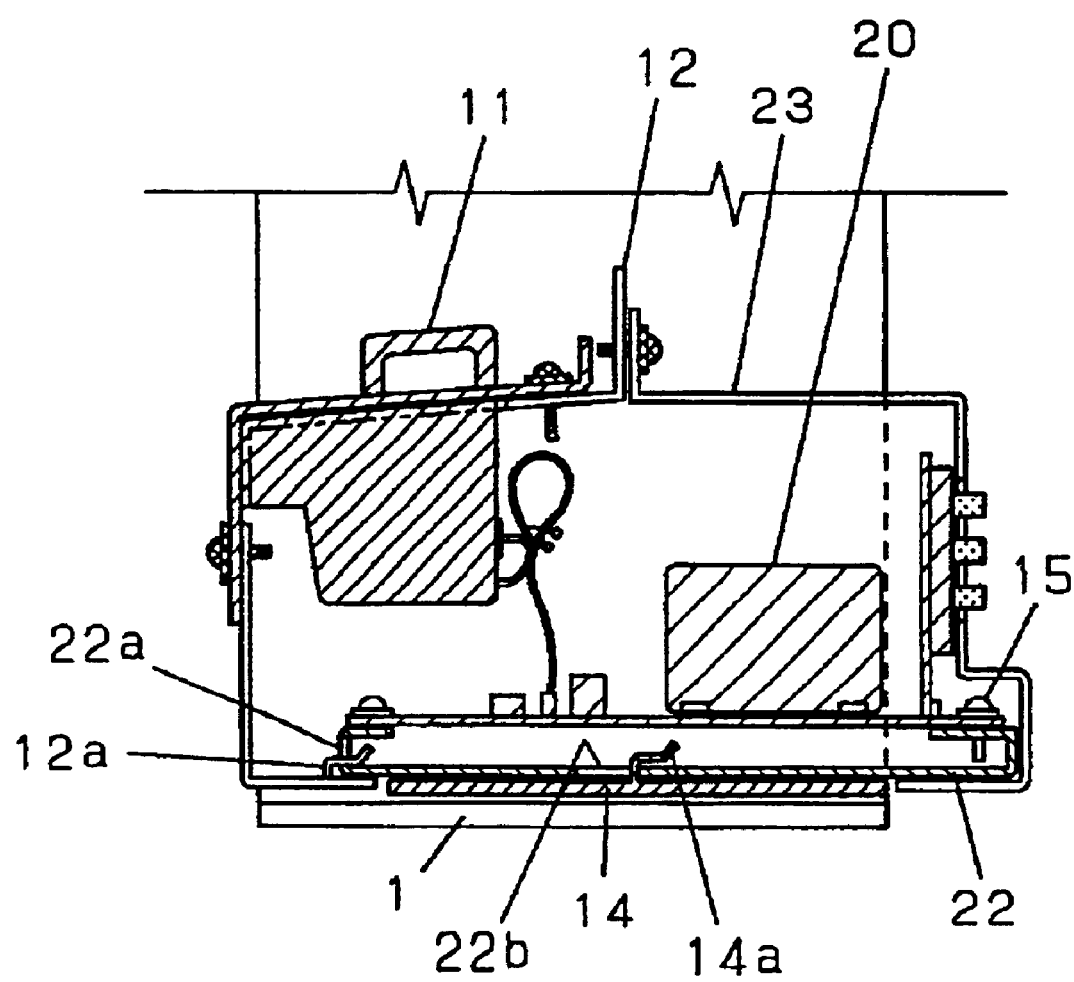
FIG. 4 is a sectional view after assembly of shield unit of the invention.

FIG. 4 is a sectional view after assembly of shield unit in the embodiment of the invention.

In FIG. 1, this projection television receiver mainly includes a cabinet 1, a base block 6, a speaker panel 5, a terminal panel 4, a speaker panel 5, a screen 3, and a back cover 2.

FIG. 2 shows constituent elements contained in the base block 6. An optical block 11 includes a projection lens 9, a projection lens shield 10, a lamp cover 7, and a lamp shield plate 8.

The optical block 11, a base metal bracket 12, a shield plate (left) 13, a shield plate (right) 14, a chassis metal bracket 22, and a shield plate (rear) 23 compose the shield unit.

The circuit unit is disposed in the shield unit, and a front terminal metal bracket 19 is attached to a front terminal board 19.

Herein, the circuit unit includes a power source shield 17 including a fan 16, a power source board 18, a signal board 20, and the front terminal board 19.

FIG. 3 shows the configuration of the shield unit and cabinet 1, back cover 2, screen 3, and speaker panel 5.

Referring to FIG. 4, the structure of the shield unit is explained.

The base metal bracket 12 supports the optical block 11. The base metal bracket 12 includes plural ungula-shape-portions 12a. The shield plate (right) 14 includes plural ungula-shape-portions 14a. Screws 15 connect the signal board 20 to the chassis metal bracket 22 mechanically and electrically. The chassis metal bracket 22 includes a fixing notch 22a and a fixing hole 22b.

The ungula-shape-portion 12a of the base metal bracket 12 is inserted into the fixing notch 22a of the chassis metal bracket 22. The ungula-shape-portion 14a of the shield plate (right) 14 is inserted into the fixing hole 22b of the chassis metal bracket 22. Thus, the base metal bracket 12, shield plate (right) 14, and chassis metal bracket 22 are fitted and assembled.

The shield plate (left) 13 is, in the same way as the shield plate (right) 14, fitted to the chassis metal bracket 22, and is assembled in the base metal bracket 12 and chassis metal bracket 22.

Further, the optical block 11 and shield plate (rear) 23 are assembled in the base metal bracket 12, shield plate (right) 14, shield plate (left) 13, and chassis metal bracket 22, and the shield unit is composed. In this manner, the shield unit of an integrally linked structure is obtained.

In other words, the chassis metal bracket 22 functions as a printed board holding section for holding the signal board 20 and power source board 18. The shield casing including the base metal bracket 12, shield plate (left) 13, shield plate (right) 14, and shield plate (rear) 23 accommodates the optical block 11 and circuit unit (circuit block). The base metal bracket 12 functions as the optical block holding section for holding the optical block 11.

The shape of the ungula-shape-portions 12a, 14a may be arbitrary, not limited to the shown shape. The shape of the fixing notch 22a and fixing hole 22b may be arbitrary, not limited to the shown shape.

Mounting of the signal board 20 on the chassis metal bracket 22 is not limited to the shown method, but may include crimping, adhering or other arbitrary method.

The mounting position of the ungula-shape-portion on the chassis metal bracket 22 is not specified.

In this configuration, screw tightening is not needed in the chassis metal bracket 22, base metal bracket 12, shield plate (right) 14, and shield plate (left) 13 of the invention. Therefore, the structure of the shield unit is simple. Yet, no limit is given to the fixing position of the printed board holding section, and mounting structure of high degree of freedom is realized.

Further, when i) ungula-shape-portions 12a of the base metal bracket 12, ii) ungula-shape-portions 14a of the shield plate (right) 14, iii) ungula-shape-portions of shield plate (left) 13, and iv) fixing notch 22a and fixing hole 22b of the chassis metal bracket 22 are arranged in multiple rows at predetermined intervals respectively, the interval between the electric grounding can be reduced. Therefore, an electrically stable shielding effect is obtained in this shield unit.

(Embodiment 2)

Figure 5:
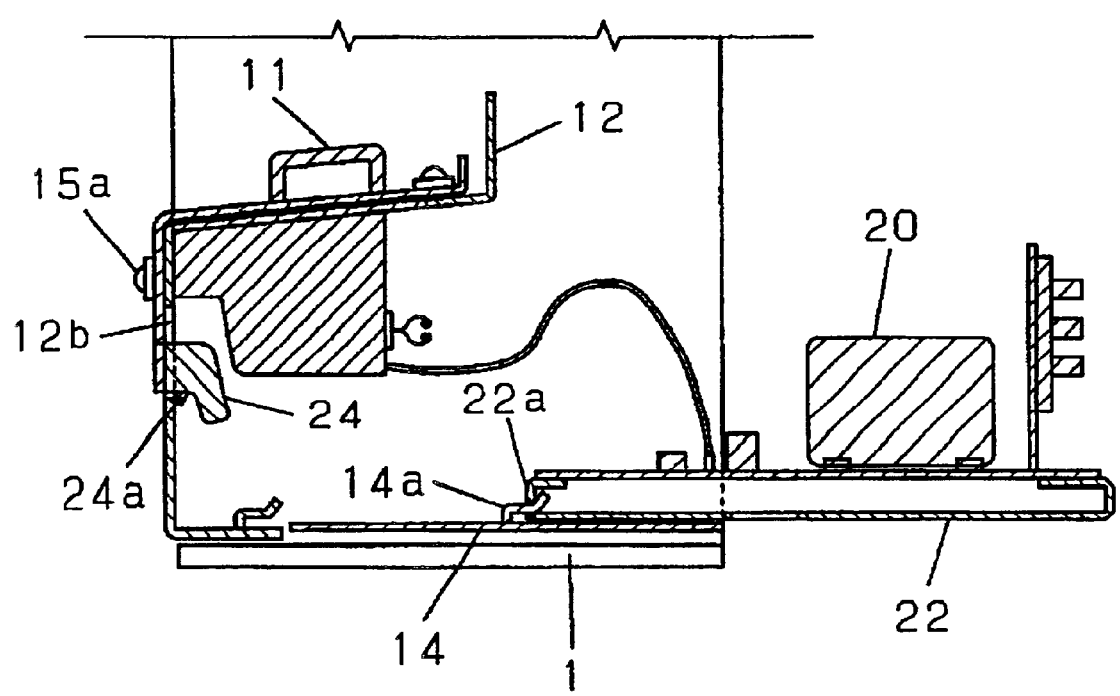
FIG. 5 is a sectional view when servicing the circuit unit of the invention.

FIG. 5 is a sectional view of the circuit unit in this embodiment of the invention showing when it is drawn out at the time of servicing.

As mentioned above, the shield plate (right) 14 has a plurality of ungula-shape-portions 14a in its inside, and the ungula-shape-portions 14a are inserted into the fixing notches 22a of the chassis metal bracket 22.

The shield plate (left) 13 is, in the same way as the shield plate (right), fitted to the chassis metal bracket 22, and is assembled in the base metal bracket 12 and chassis metal bracket 22.

Therefore, as shown in FIG. 5, the serviceman removes the back cover 2 from the cabinet 1, draws out the chassis metal bracket 22 backward, and fixes at an arbitrary position. As a result, the signal board 20 and other printed wiring boards can be serviced easily. Moreover, screw tightening is not needed in the chassis metal bracket 22 and shield plate (right) 14, and no tool is needed. Hence, the service is done easily.

(Embodiment 3)

FIG. 5 also shows a sectional view before servicing of the optical unit in this embodiment of the invention.

The structure before servicing is explained. The optical block 11 has a plurality of service hooks 24 in its inside. The service hooks 24 are inserted into the base metal bracket 12. Fixing protrusions 24a of service hooks 24 are inserted into fixing holes 12b of the base metal bracket 12. Further, the base metal bracket 12 and optical block 11 are compressed and fixed by the own weight of the optical block 11, and are reinforced and fixed by colored screws 15a.

The shape of the service hooks 24, fixing protrusions 24a, and fixing holes 12b are not limited to the shape shown in FIG. 5. The mounting position on the base metal bracket 12 by the colored screws 15a is not limited to the position shown in FIG. 5.

In this configuration, the optical block is pressed to and conducts with the shield casing by its own weight. Therefore, the optical block 11 and base metal bracket 12 conduct securely with each other as shield casing, and electromagnetic shielding is assured. Besides, they are coupled by a small number of screws.

Moreover, screw tightening is not needed around the fixing protrusions 24a and fixing holes 12b of the chassis metal bracket 22 and base metal bracket 12, and servicing is easy and simple. Since the servicing screws are colored, they are not confused with other structural screws, and the servicing work is easy.

Figure 6:
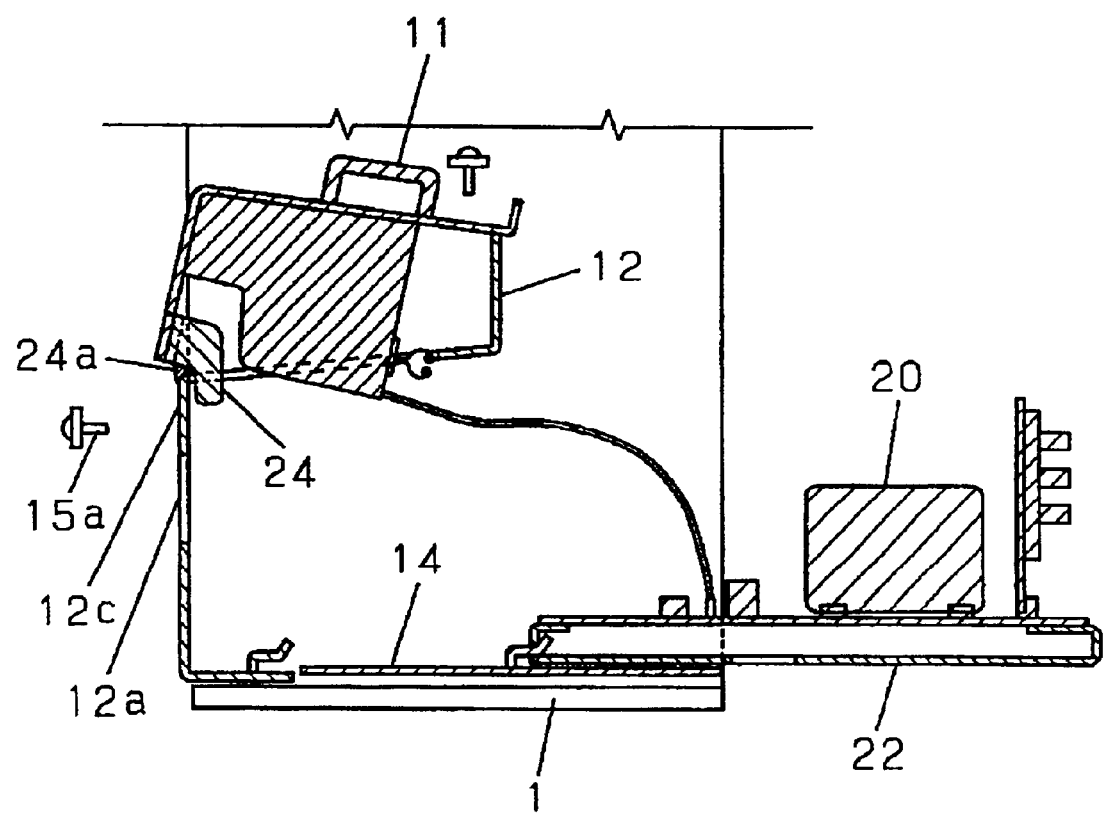
FIG. 6 is a sectional view when servicing the optical unit of the invention.

FIG. 6 is a sectional view showing a state of lifting of optical unit when servicing in this embodiment.

The optical block 11 has a plurality of service hooks 24 in its inside. The optical block 11 is lifted above the base metal bracket 12. Further, the service hooks 24 and fixing protrusions 24a are inserted into the fixing notches 12c provided in the base metal bracket 12, and the optical block 11 is supported by the base metal bracket 12.

In this configuration, the optical block 11 does not required servicing tool or fixing screw, and the service is simple and easy.

Further, when dismounting the optical block, it can be provisionally fixed on the top of the shield casing. As a result, it is easy to work at the lower side or lateral side of the optical block when assembling or servicing the optical block.

(Embodiment 4)

Figure 7:
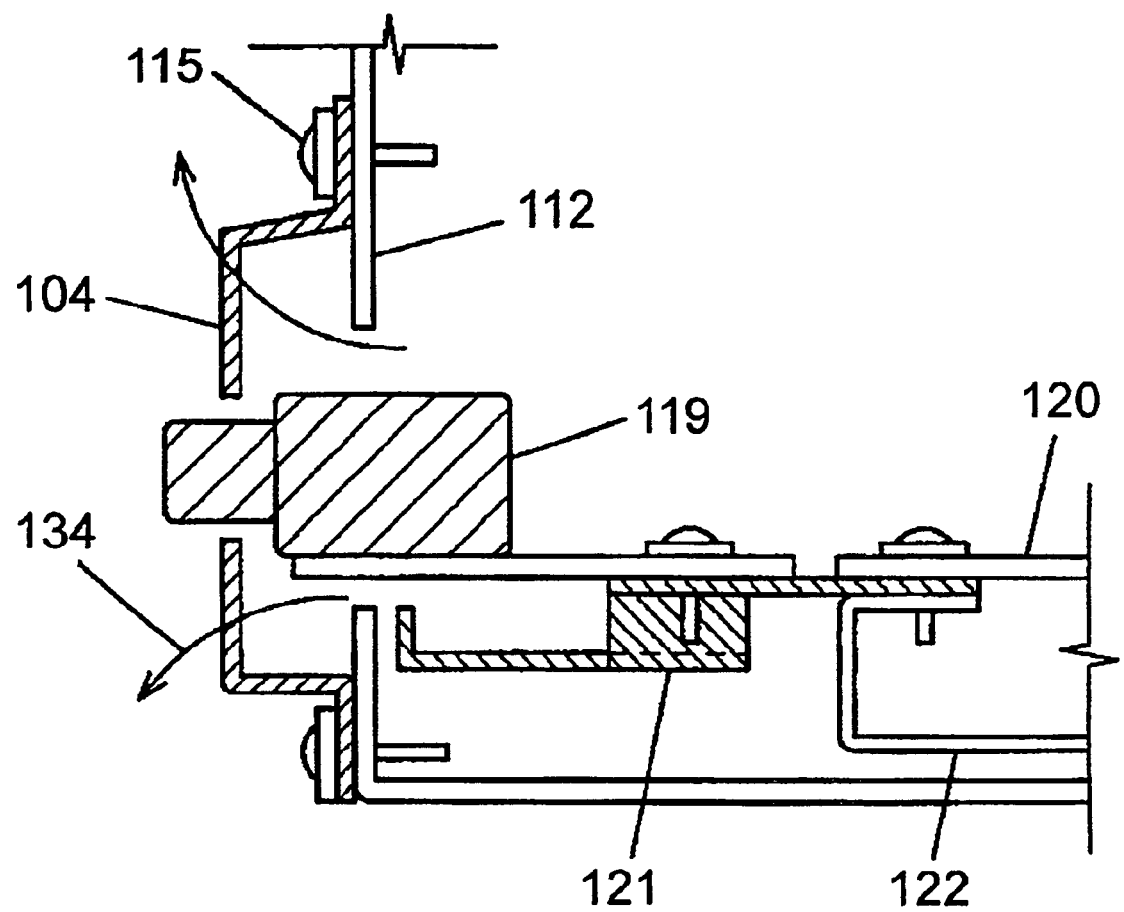
FIG. 7 is a sectional view after assembly of terminal board unit in a prior art.
Figure 8:
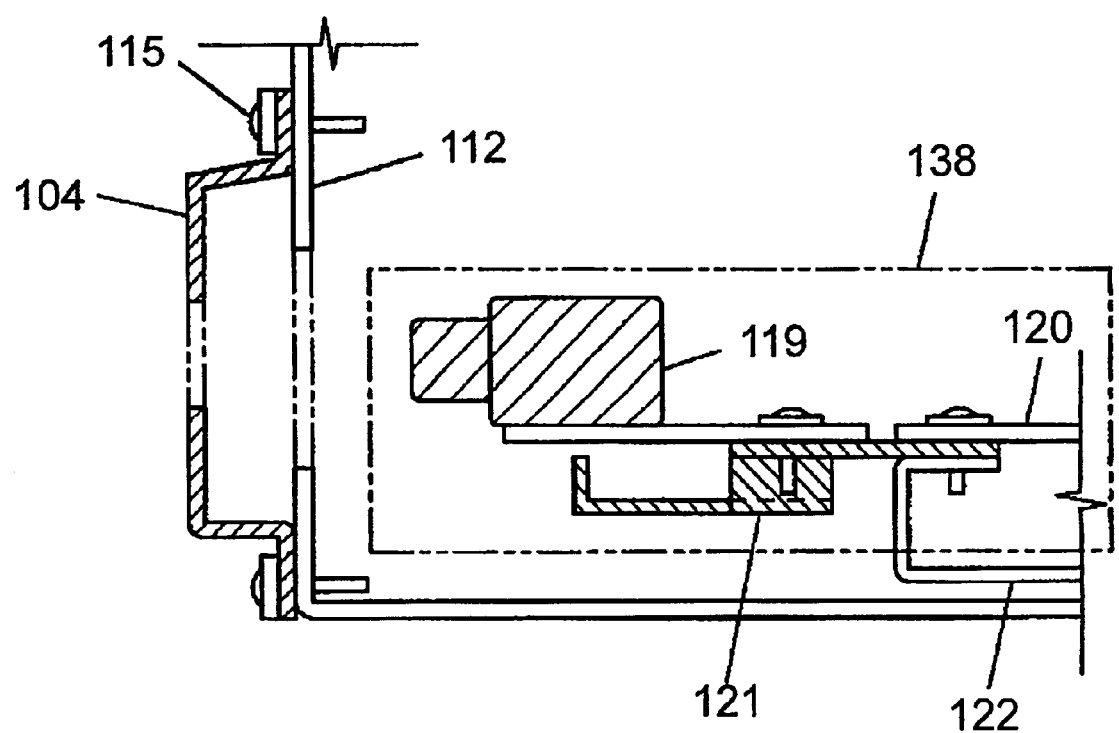
FIG. 8 is a sectional view before assembly of terminal board unit in a prior art.

FIG. 7 and FIG. 8 show sectional views after and before assembly of a conventional terminal board unit.

FIG. 7 shows the mutual relation of terminal panel 104 and base metal bracket 112, and front terminal unit 138 shown in FIG. 8. The front terminal unit 138 includes a front terminal board 119 and a front terminal metal bracket 121, and is coupled to a signal board 120 and a chassis metal bracket 122.

In the conventional terminal board unit 138, the front terminal board 119 is mechanically fixed to the front terminal metal bracket 121 by screws 15. In this configuration, as shown in FIG. 7, undesired radiation 134 of electromagnetic wave may leak out from the gap between the base metal bracket 112 and the front terminal metal bracket 121 or front terminal board 119, and the electromagnetic shielding effect is lowered.

Figure 9:
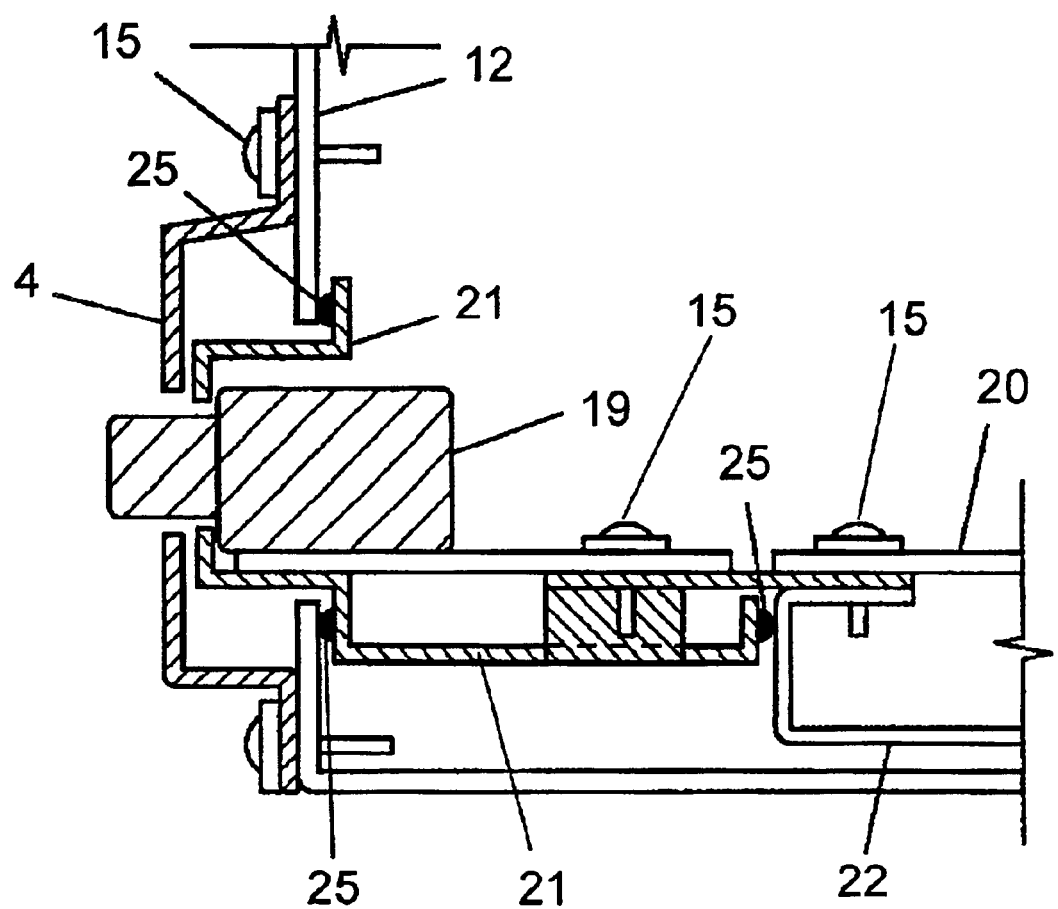
FIG. 9 is a sectional view after assembly of terminal board unit with protrusions of the invention.
Figure 10:
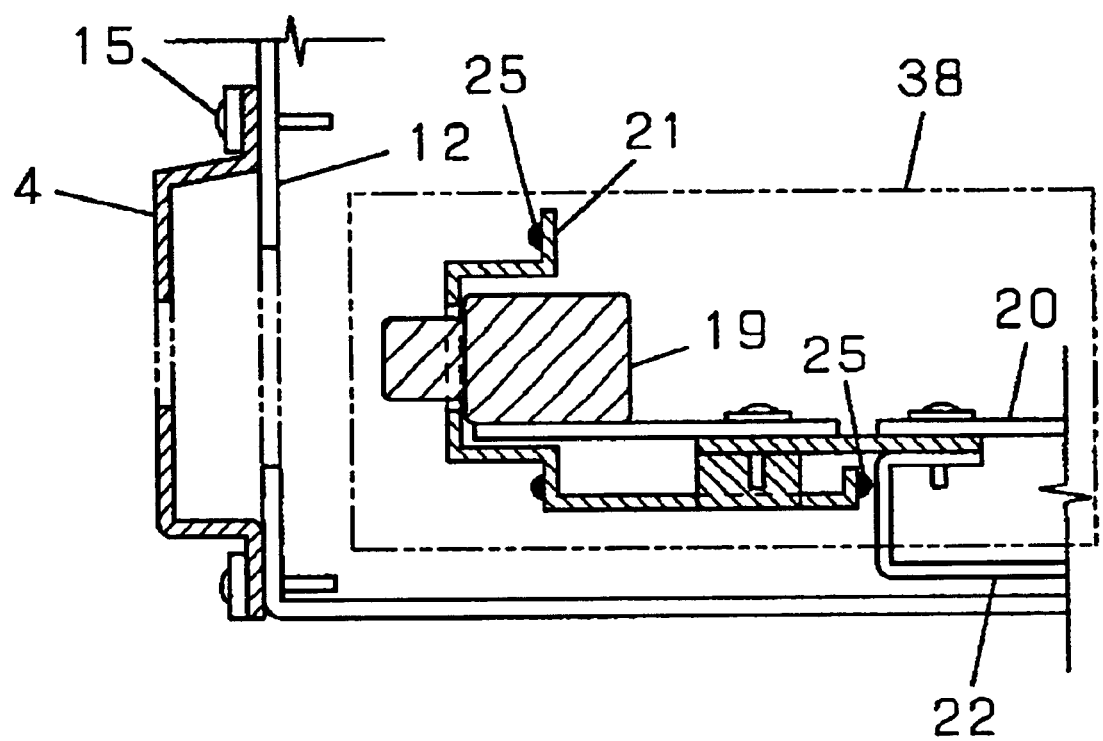
FIG. 10 is a sectional view before assembly of terminal board unit with protrusions of the invention.

FIG. 9 and FIG. 10 show sectional views after and before assembly of a terminal board unit with protrusions according to the embodiment of the invention.

FIG. 9 shows the mutual relation among terminal panel 4 and base metal bracket 12, and front terminal unit 38 shown in FIG. 10. The front terminal unit 38 includes a front terminal board 19 and a front terminal metal bracket 21, and is coupled to a signal board 20 and a chassis metal bracket 22. Further, the front terminal metal bracket 21 has grounding protrusions 25.

In the front terminal unit 38, the front terminal board 19 is mechanically and electrically fitted to the front terminal metal bracket 21 by screws 15. Further, the front terminal metal bracket 21 is mechanically and electrically fitted to the chassis metal bracket 22 and signal board 20 by screws 15. Moreover, the contact pressure is heightened by point contact of the grounding protrusions 25 provided in the front terminal metal bracket 21, and the base metal bracket 12 and chassis metal bracket 22, so that the contact resistance is lowered to conduct electrically.

The shape of the grounding protrusions 25 is not limited to the shape shown in FIG. 9 and FIG. 10. Connection of the front terminal metal bracket 21 and chassis metal bracket 22 is not specified.

In this configuration, screw tightening is not needed in the front terminal metal bracket 21 and the base metal bracket 12 of the shield casing of the invention. Therefore, servicing is easy and simple. In addition, the shielding effect against electromagnetic interference is enhanced.

(Embodiment 5)

Figure 11:
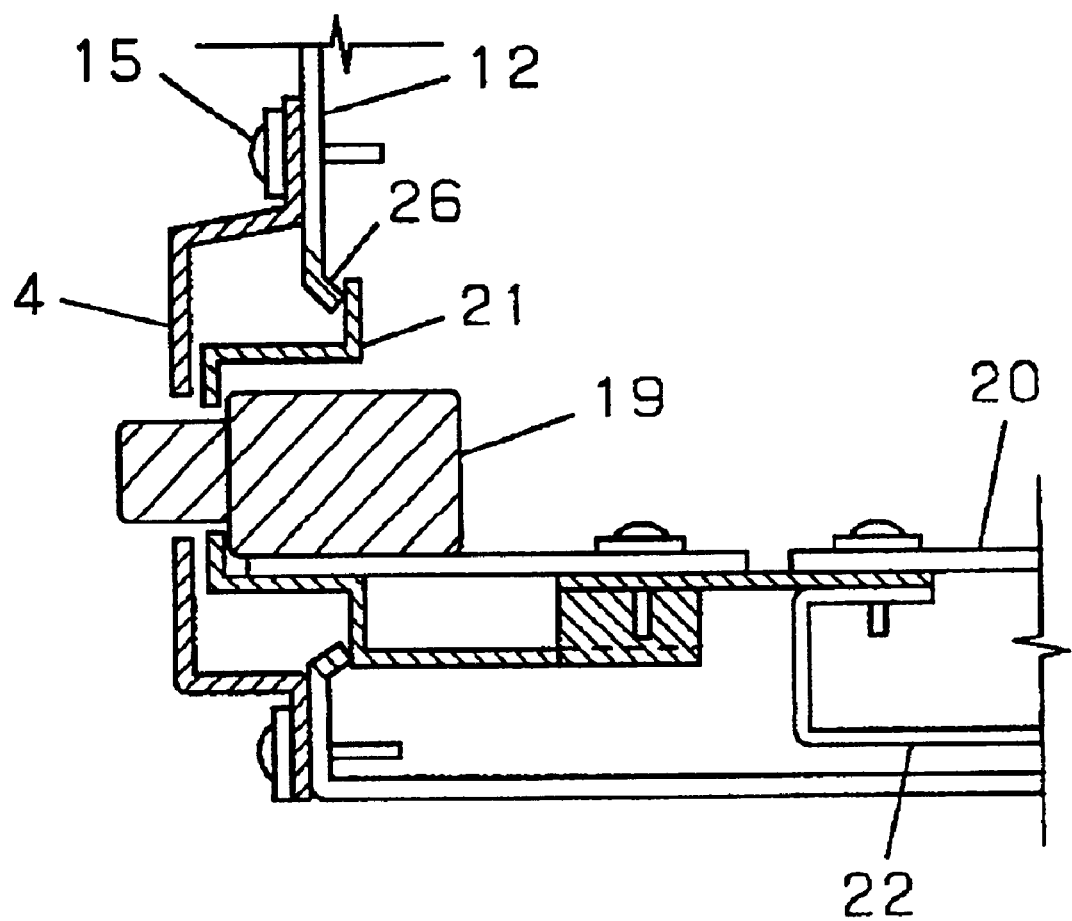
FIG. 11 is a sectional view after assembly of terminal board unit with bends of the invention.
Figure 12:
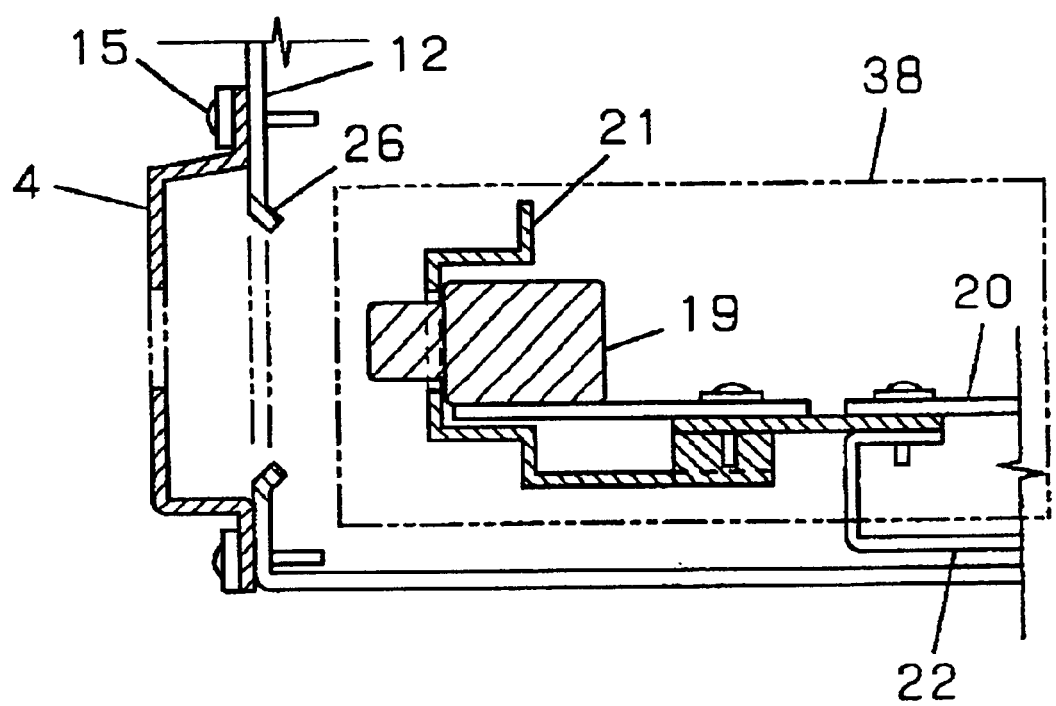
FIG. 12 is a sectional view before assembly of terminal board unit with bends of the invention.

FIG. 11 and FIG. 12 show sectional views after and before assembly of a terminal board unit with bends according to this embodiment of the invention.

The material and structure of the front terminal unit 38 in this embodiment is basically the same as in embodiment 4. The assembling procedure of the front terminal unit 38, and the mounting procedure of the base metal bracket 12 for composing the shield casing are also the same as in embodiment 4.

What differs from embodiment 4 is that grounding bends 26 are provided instead of the grounding protrusions 25, and their end faces are designed to contact elastically by cutting off the metal film of the outside wall of the front terminal metal bracket 21.

The taper shape of the grounding bends 26 is not limited to the shape shown in FIG. 11 and FIG. 12.

Thus, electric contact between the front terminal metal bracket 21 and shield casing is assured, and secure shielding is realized.

(Embodiment 6)

Figure 13:
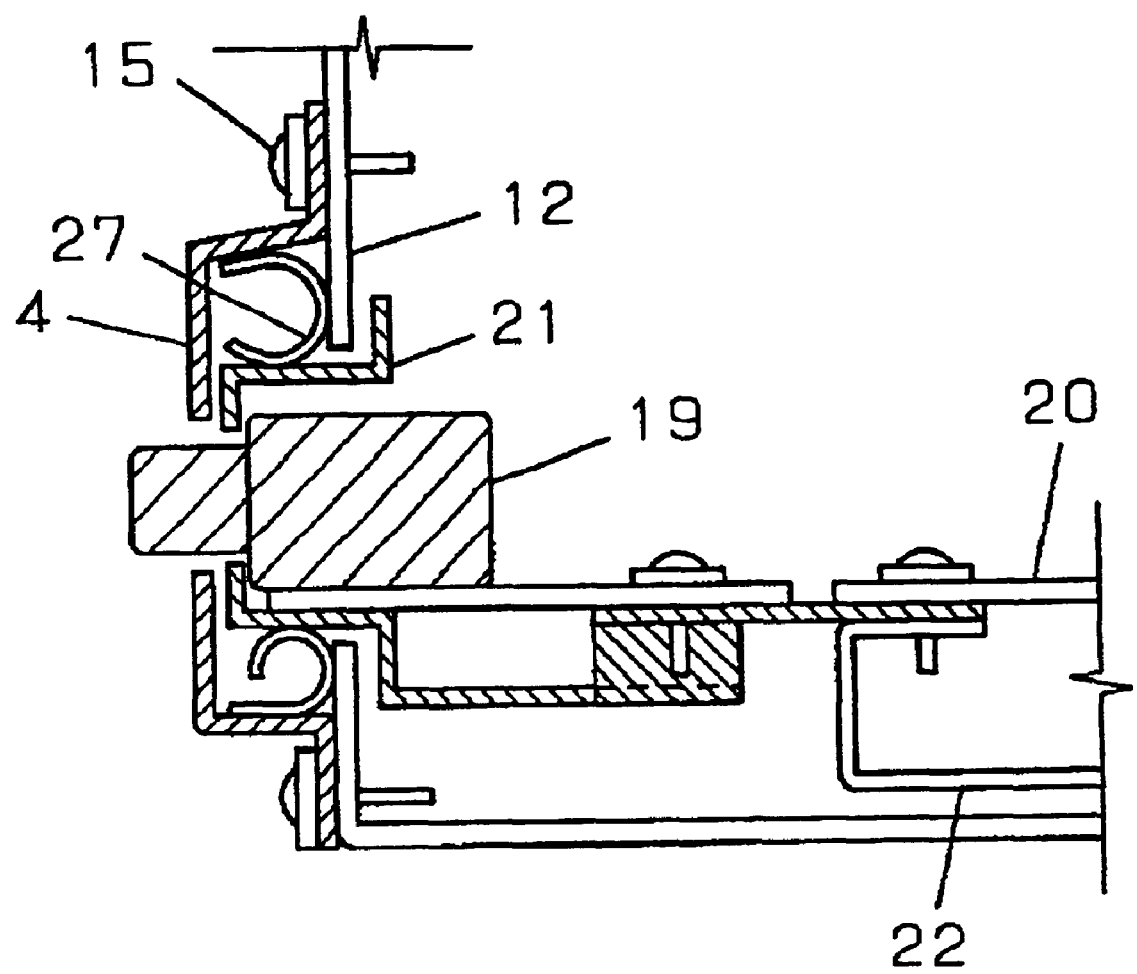
FIG. 13 is a sectional view after assembly of terminal board unit with springs of the invention.
Figure 14:
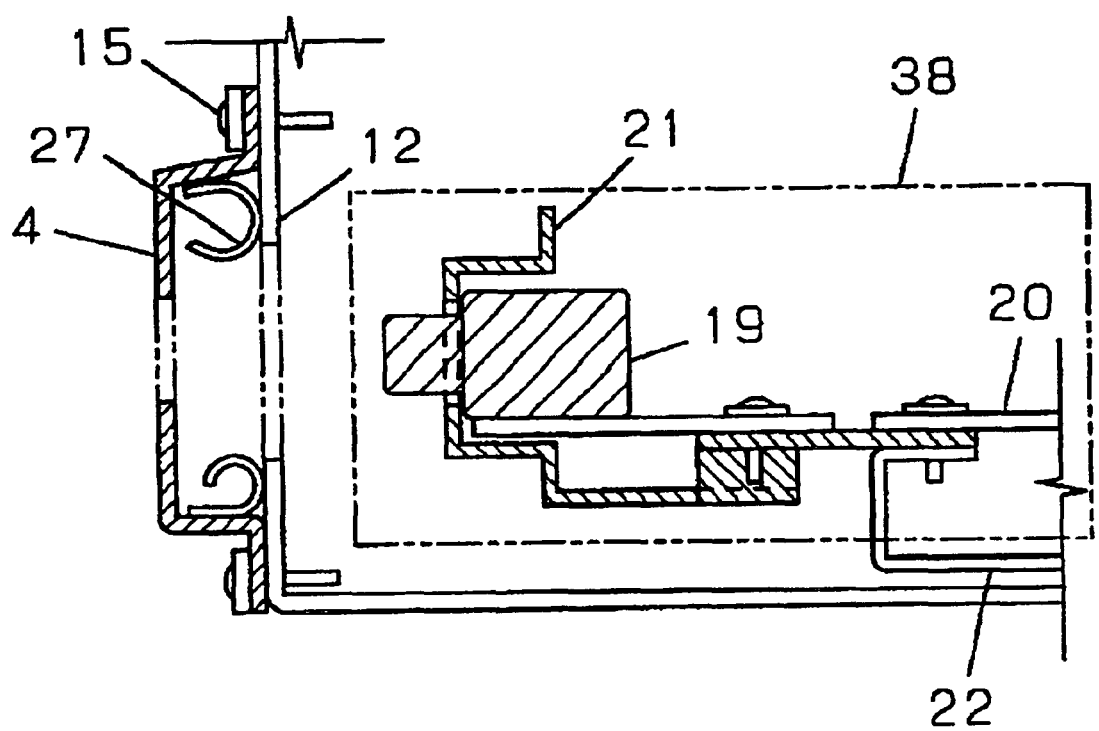
FIG. 14 is a sectional view before assembly of terminal board unit with springs of the invention.

FIG. 13 and FIG. 14 show sectional views after and before assembly of a terminal board unit with springs according to this embodiment of the invention.

The material and structure of the front terminal unit 38 in this embodiment is basically the same as in embodiment 4. The assembling procedure of the front terminal unit 38, and the mounting procedure of the base metal bracket 12 for composing the first shield casing are also the same as in embodiment 4.

What differs from embodiment 4 is that grounding springs 27 are provided instead of the grounding protrusions 25, and their end faces are designed to couple electrically and contact elastically with the outside wall of the base metal bracket 12 and outside wall of the front terminal metal bracket 21. The grounding springs 27 are crimped and fitted to the terminal panel 4, and the terminal panel 4 is fastened to the base metal bracket 12 by screws 15.

The shape of the grounding springs 27 is not limited to the shape shown in FIG. 13 and FIG. 14. The mounting method of the grounding springs 27 on the terminal panel 4 is not limited, and may include welding, adhering or other methods.

(Embodiment 7)

Figure 15:
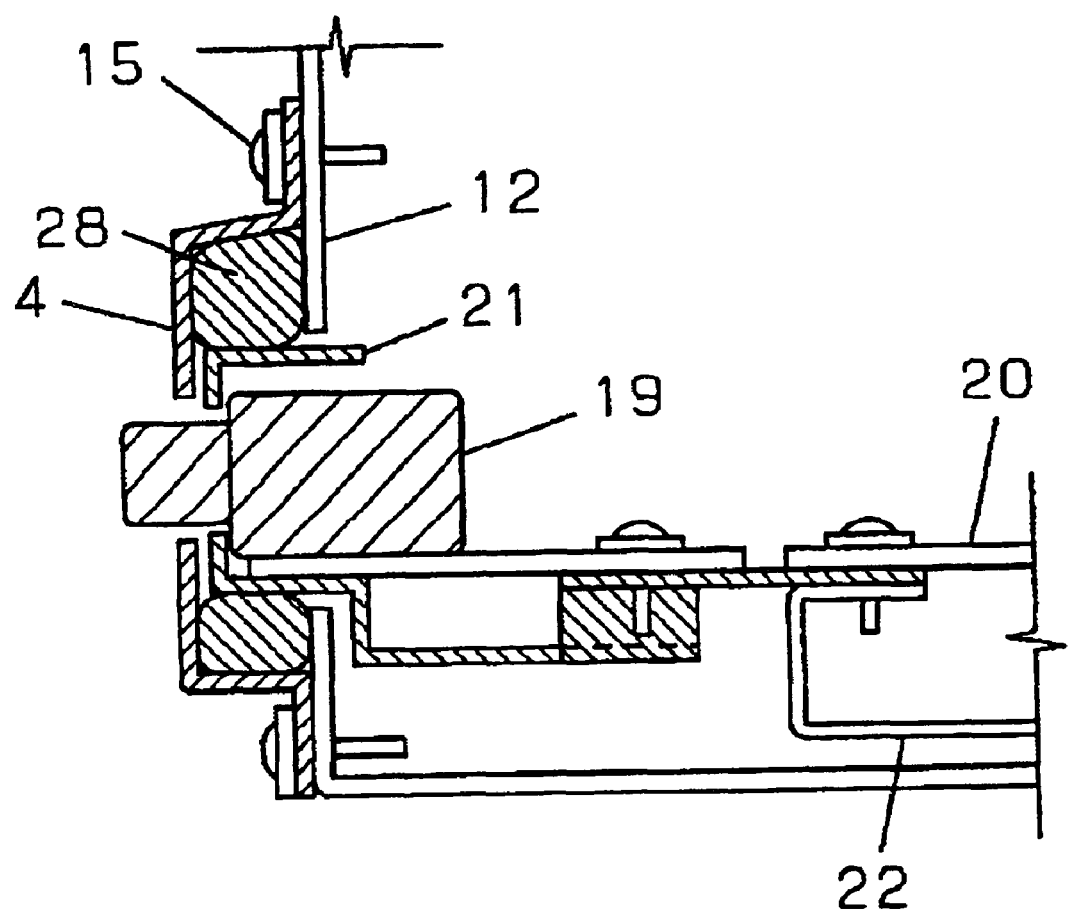
FIG. 15 is a sectional view after assembly of terminal board unit with gaskets of the invention.
Figure 16:
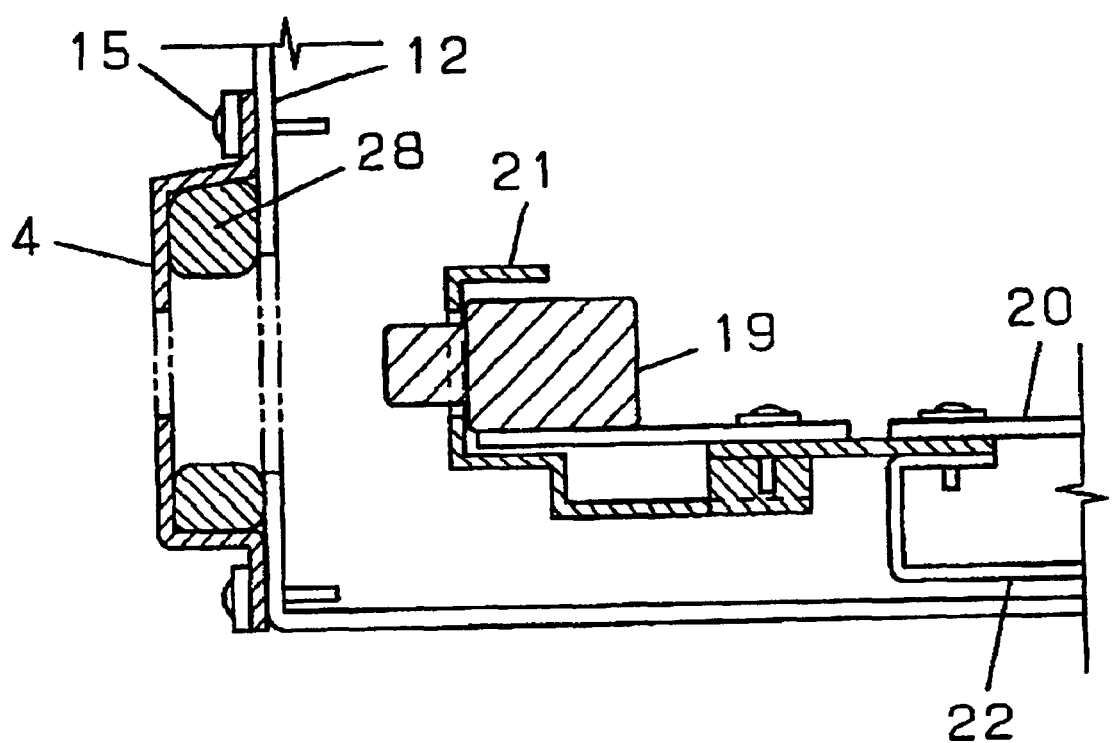
FIG. 16 is a sectional view before assembly of terminal board unit with gaskets of the invention.

FIG. 15 and FIG. 16 show sectional views after and before assembly of a terminal board unit with gaskets according to this embodiment of the invention.

The material and structure of the front terminal unit 38 in this embodiment is basically the same as in embodiment 6. The assembling procedure of the front terminal unit 38, and the mounting procedure of the base metal bracket 12 for composing the first shield casing are also the same as in embodiment 6.

What differs from embodiment 6 is that conductive gaskets 28 are provided instead of the grounding springs 27, and their end faces are designed to couple electrically and contact elastically with the outside wall of the base metal bracket 12 and outside wall of the front terminal metal bracket 21. The shape of the conductive gaskets 28 is not limited to the shape shown in FIG. 15 and FIG. 16.

(Embodiment 8)

Figure 17:
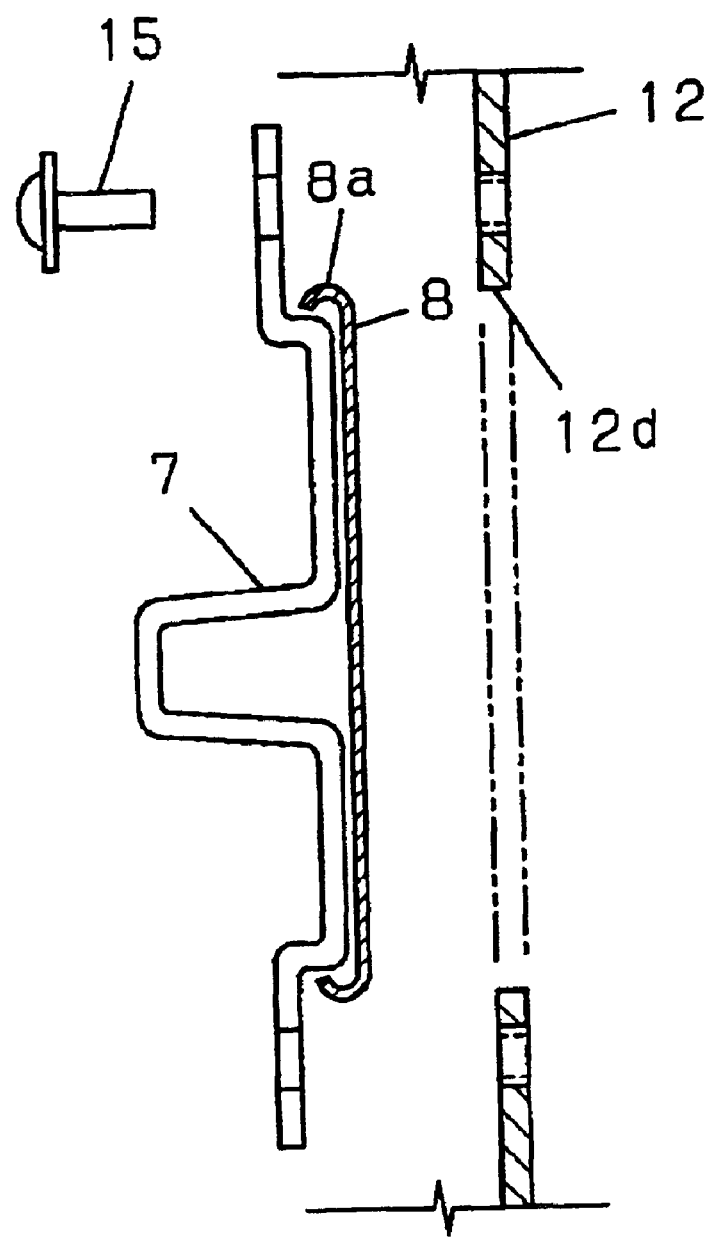
FIG. 17 is a sectional view after assembly of cover unit with springs of the invention.
Figure 18:
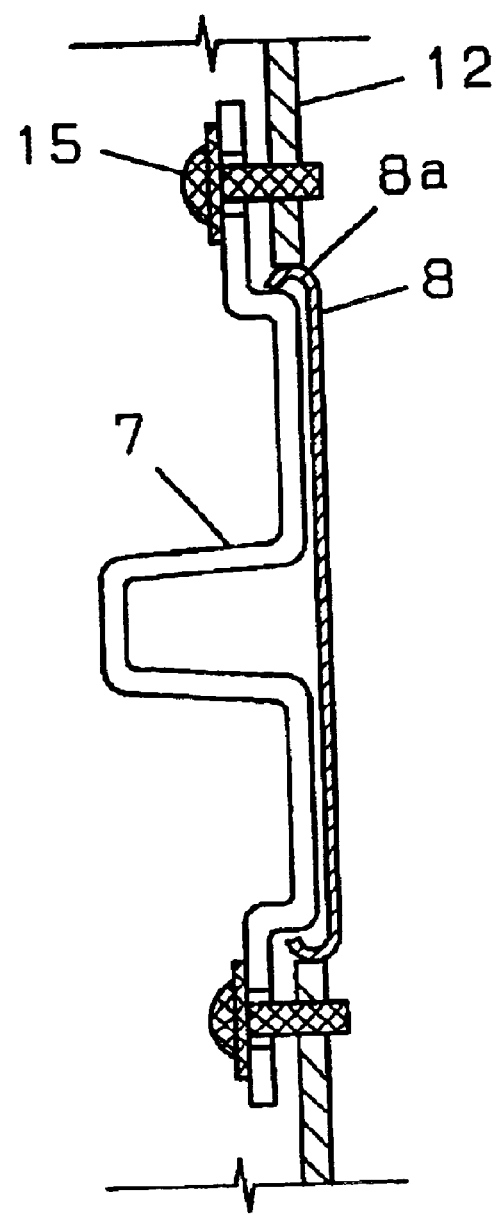
FIG. 18 is a sectional view before assembly of cover unit with springs of the invention.

FIG. 17 and FIG. 18 show sectional views before and after assembly of cover unit with springs according to the embodiment.

Figure 19:
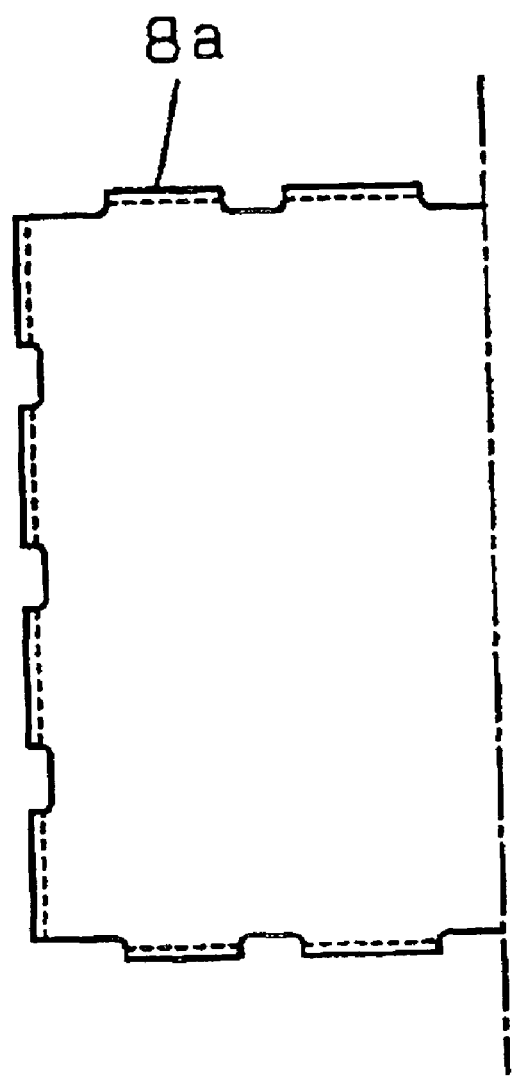
FIG. 19 is a plane view of shield cover with springs of the invention.

FIG. 19 is a plane view of lamp shield plate of the embodiment, particularly showing the relation of the lamp shield plate 8 and its grounding springs 8a.

In FIG. 17, the lamp shield plate 8 is mechanically fitted to the resin-made lamp cover 7 by crimping. Further, as shown in FIG. 18, the lamp cover 7 is fixed to the base metal bracket 12 by screws 15. At this time, the grounding springs 8a provided in the lamp shield plate 8 contact elastically and conduct electrically with the cut-off section of the opening 12d of the base metal bracket 12. The shape of the grounding springs 8a is not limited to the shape shown in FIG. 17, FIG. 18 and FIG. 19. Method of connection of lamp cover 7 and lamp shield plate 8 is not limited to crimping only.

In this configuration, the grounding springs 8a of the lamp shield plate 8 assure stable conductivity with the base metal bracket 12 of the shield casing regardless of its surface treatment state. Therefore, the shielding effect against the electromagnetic interference is enhanced. Also in this configuration, screw tightening between the shield casings is not needed, and the shield structure is simplified. Only screws for tightening the structural elements are needed, and the number of necessary screws is decreased.

When grounding springs 8a are disposed in multiple rows at predetermined intervals, intervals between the electric grounding can be narrowed. Hence, electric shielding is assured in stable condition.

(Embodiment 9)

Figure 20:
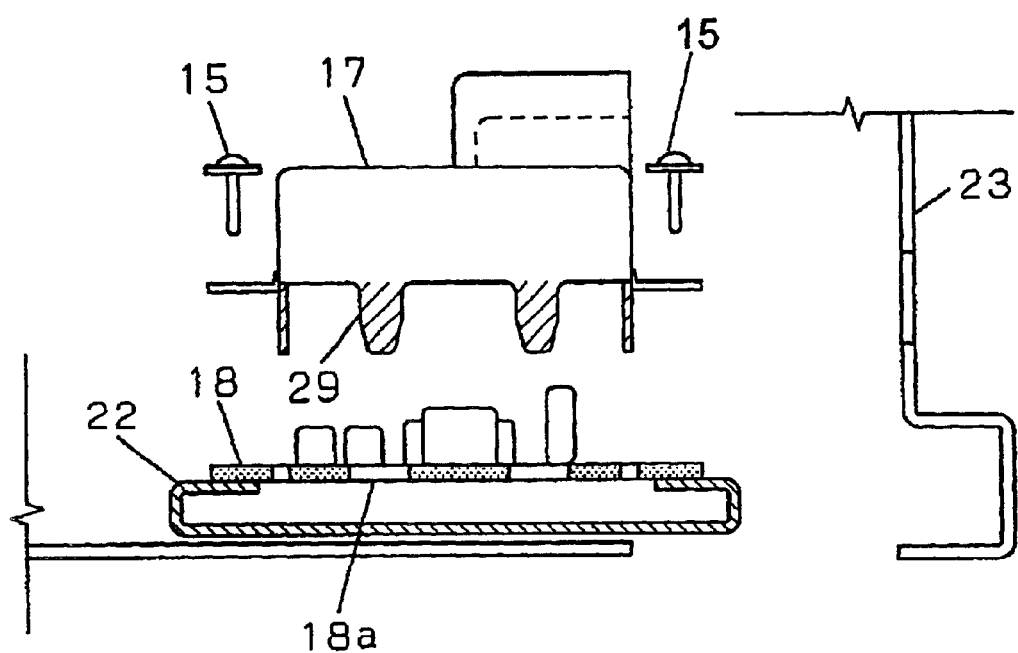
FIG. 20 is a side view before assembly of power source circuit unit of the invention.
Figure 21:
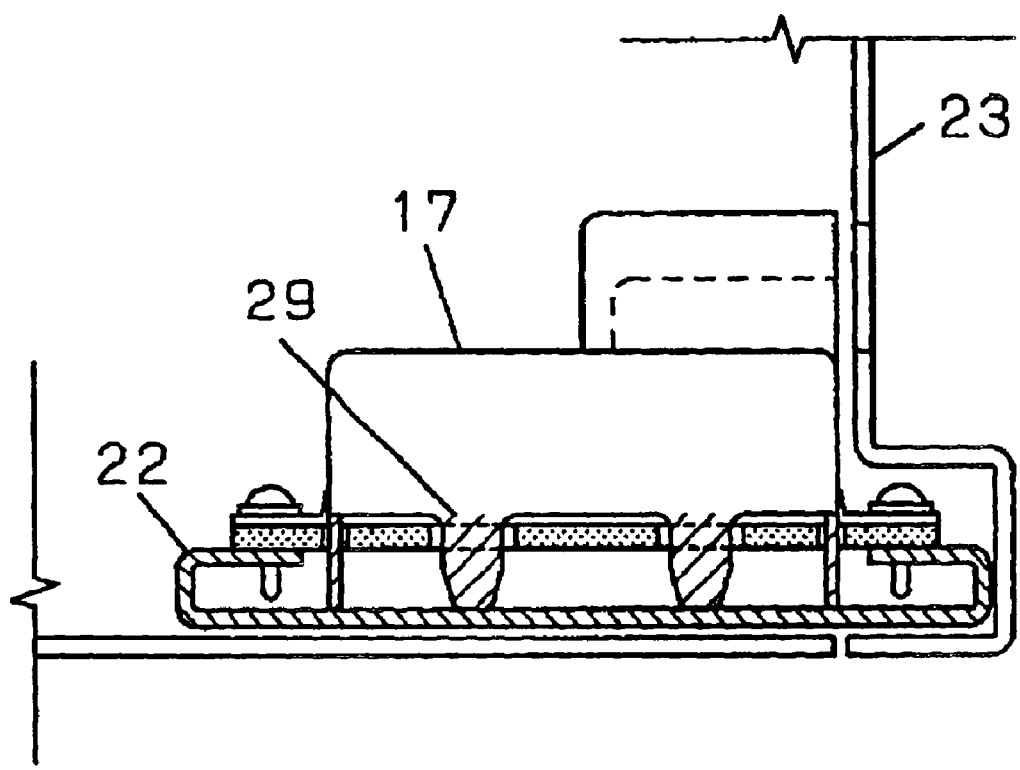
FIG. 21 is a side view after assembly of power source circuit unit of the invention.
Figure 22:
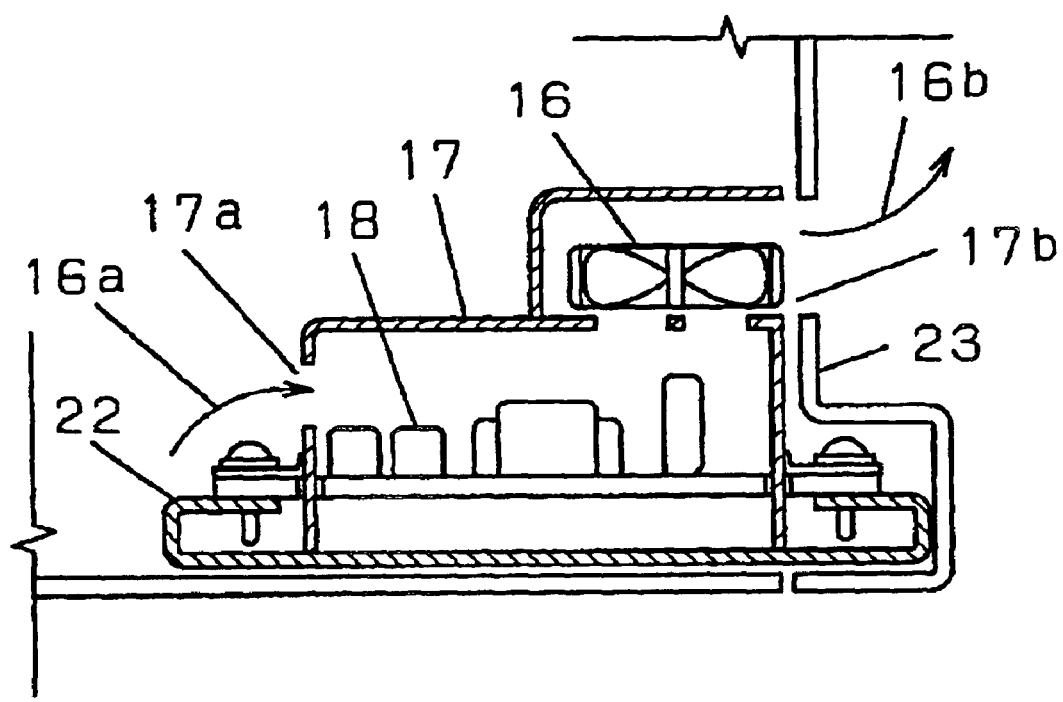
FIG. 22 is a sectional view after assembly of power source circuit unit of the invention.

FIG. 20 and FIG. 21 are side views before and after assembly of power source circuit unit of the invention, and FIG. 22 shows a sectional view after assembly of power source circuit unit of the invention.

In FIG. 20, a power source shield 17 is attached to a chassis metal bracket 22 by screws 15 so that a plurality of grounding legs 29 provided at the side of the power source shield 17 may penetrate through slots 18a provided in a power source board 18 attached to the chassis metal bracket 22. At this time, as shown in FIG. 21, the screws 15 tighten the power source board 18 together with the chassis metal bracket 22 and fix the board 18 to the chassis metal bracket 22. Herein, the top of the chassis metal bracket 22 elastically contacts with the grounding legs 29.

In this configuration, the shield unit is integrally linked, and the power source board 18 is enclosed in a simple structure, and is shielded electrically.

The shape and position of the grounding legs 29 and slots 18a are not limited to those shown in FIG. 21 and FIG. 22. Method of mounting of power source board 18 and power source shield 17 on the chassis metal bracket 22 is not limited, and may include crimping, adhering or other methods.

In this configuration, there are only few screw tightening portions in the chassis metal bracket 22, power source board 18, and power source shield 17. Hence, the shield unit is simplified in structure.

When grounding legs 29 and slots 18a are disposed in multiple rows at predetermined intervals, intervals between the electric grounding can be narrowed. Hence, electric shielding is assured in stable condition in this shield unit. Further by direct conduction between the grounding legs 29 and power source board 18 by spring or solder, a more stable electric shielding is obtained. Besides, since the weight of the power source shield 17 or impact of falling or vibration is not applied directly to the power source board 18, an effective mechanical strength of the power source board 18 is assured.

(Embodiment 10)

FIG. 22 is a sectional view of cooling structure of power source circuit unit having a cooling fan.

The cooling structure is explained. In FIG. 22, a fan 16 is disposed in a power source shield 17. A plurality of grounding legs 29 disposed at the side of the power source shield 17 penetrate through slots 18a disposed in a power source board 18 attached to a chassis metal bracket 22. Screws 15 tighten the power source shield 17, power source board 18, and chassis metal bracket 22 together. Thus, mechanically, the cooling structure for cooling the power source board 18 is linked integrally.

Herein, intake air 16a passes through an intake port 17a, and is sucked into this cooling structure, and after cooling the power source board 18, it is blown out from an exhaust port 17b as exhaust 16b.

The shape and position of the grounding legs 29 and slots 18a are not limited to those shown in FIG. 22. Method of mounting of power source board 18 and power source shield 17 on the chassis metal bracket 22 is not limited, and may include crimping, adhering or other methods. The shape and position of the fan 16, intake port 17a, and exhausts port 17b are not limited but are arbitrary.

In this configuration, there are only few screw tightening portions in the chassis metal bracket 22, power source board 18, and power source shield 17, and the cooling structure is simplified.

Since the gap between the power source shield 17 and power source board 18 is small, the cooling structure is excellent in air tightness.

When the grounding legs 29 and slots 18a are arranged in multiple rows at predetermined intervals, the physical space gap is small and the air tightness is enhanced. Therefore, a highly efficient cooling structure is realized.

(Embodiment 11)

Figure 23:
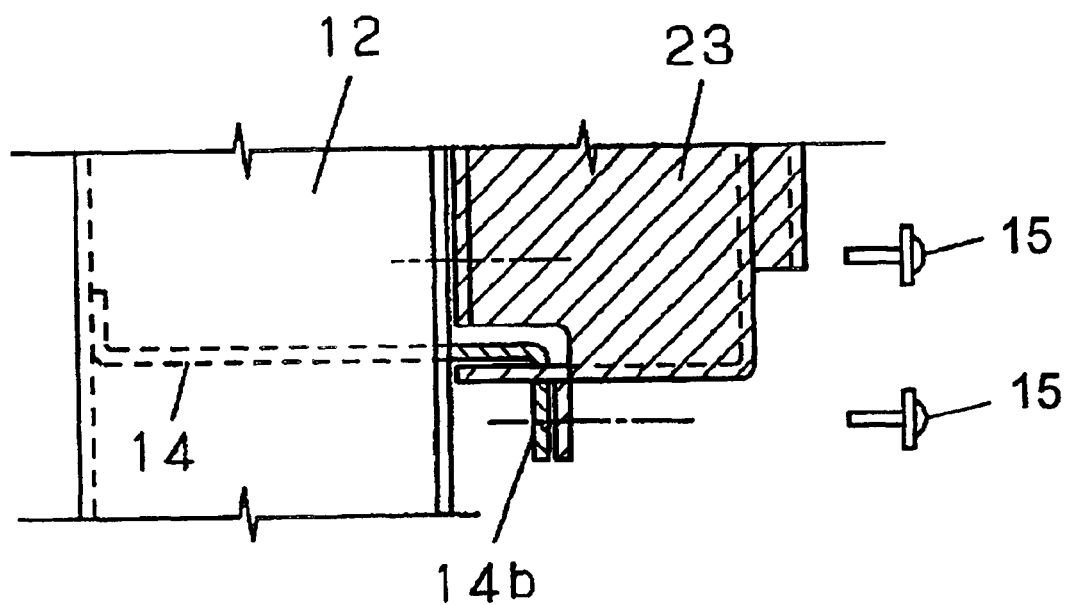
FIG. 23 is a top view after assembly of external shield component of the invention.
Figure 24:
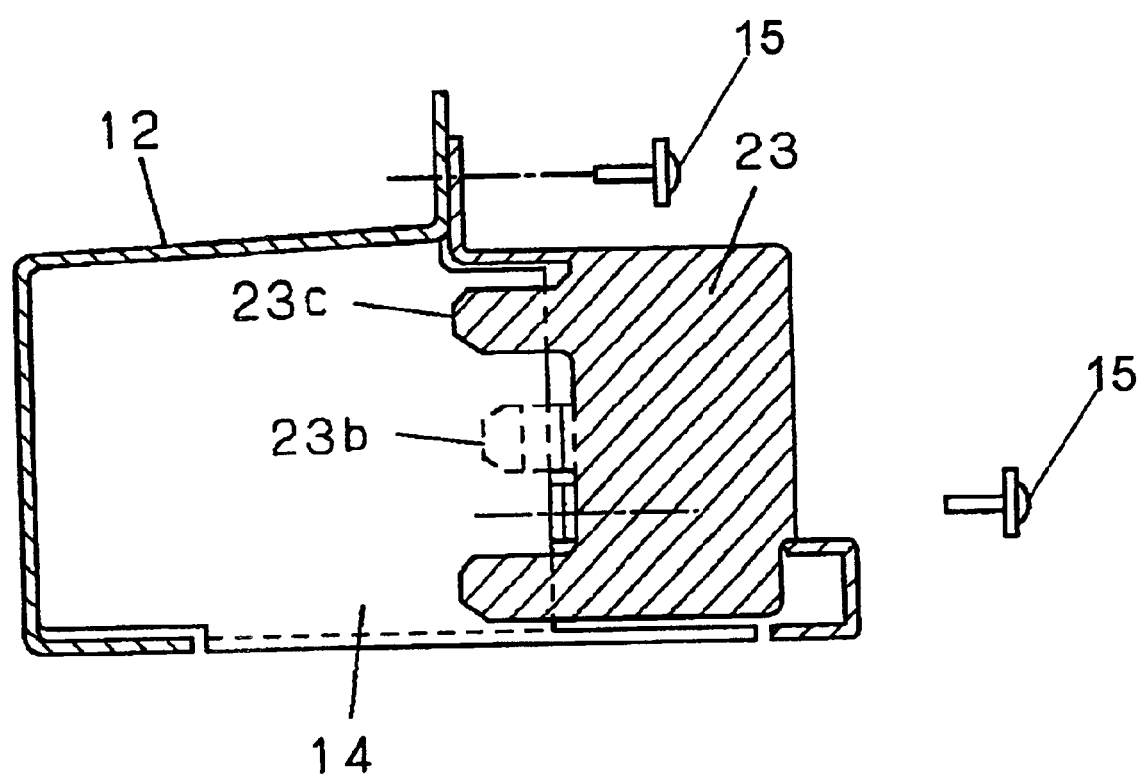
FIG. 24 is a side view after assembly of external shield component of the invention.
Figure 25:
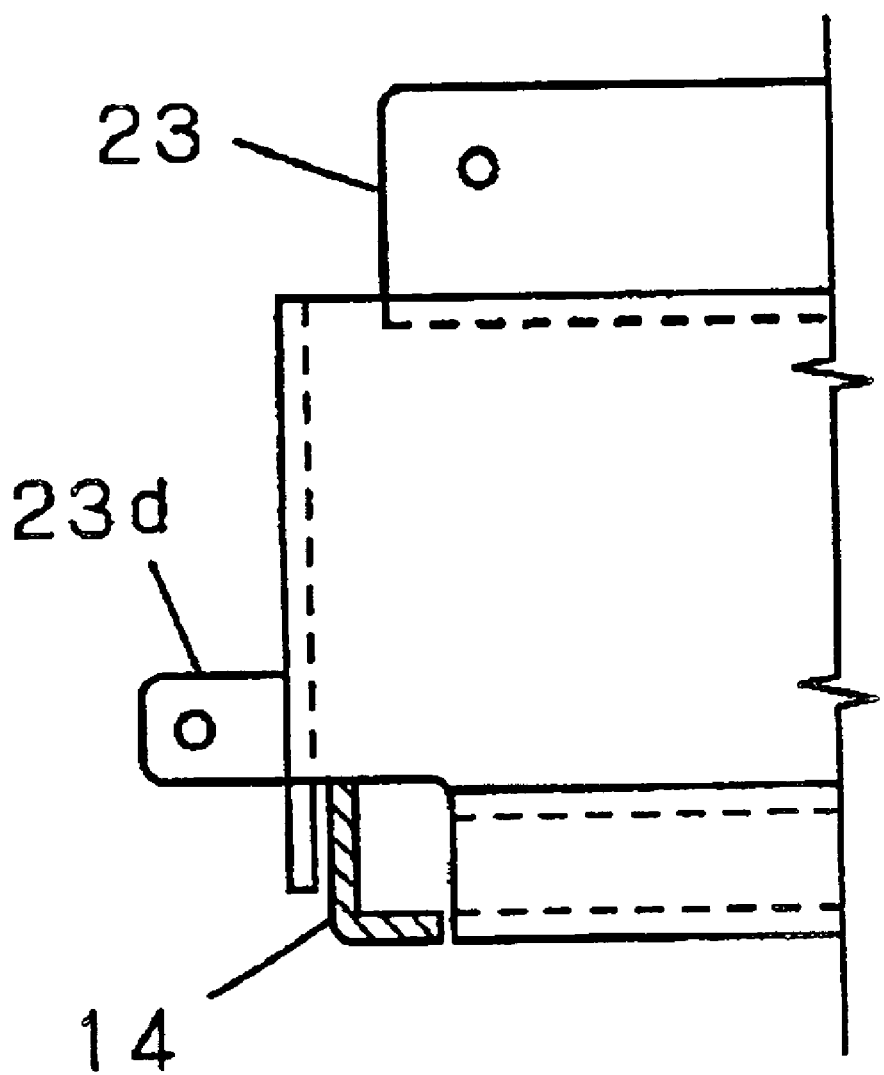
FIG. 25 is a rear view after assembly of external shield component of the invention.

FIG. 23, FIG. 24, and FIG. 25 show top view, side view, and rear view after assembly of external shield components of the invention.

Figure 26:
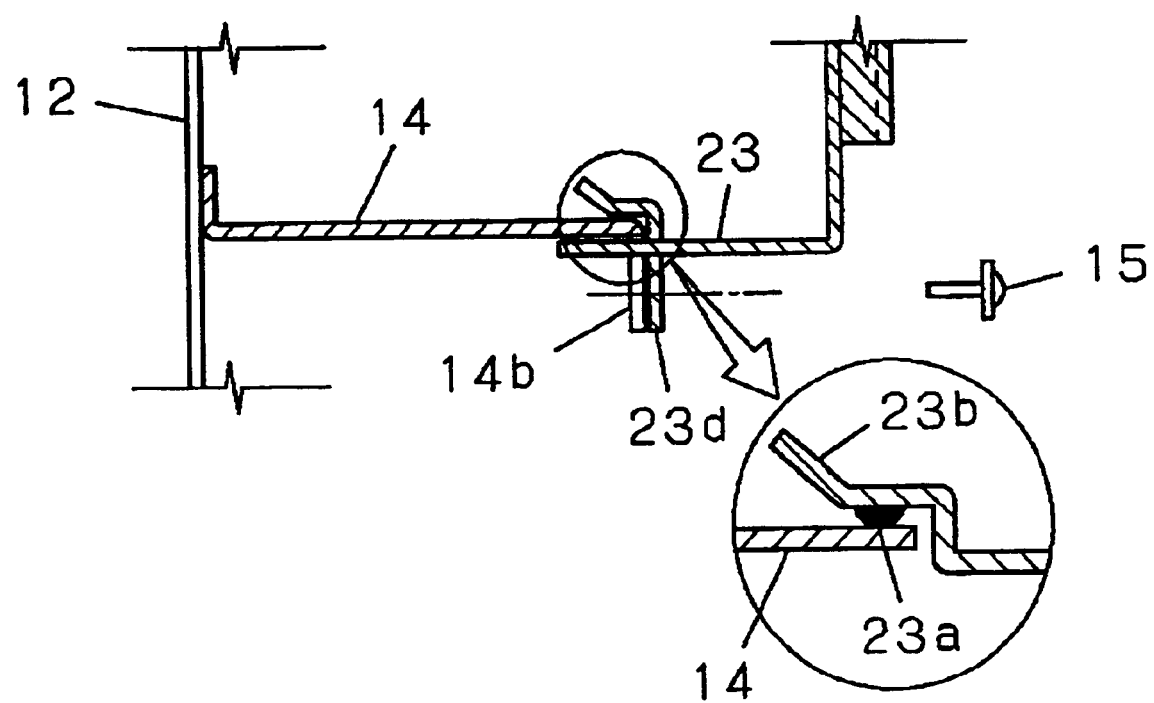
FIG. 26 is a top sectional view and detailed view after assembly of external shield component of the invention.
Figure 27:
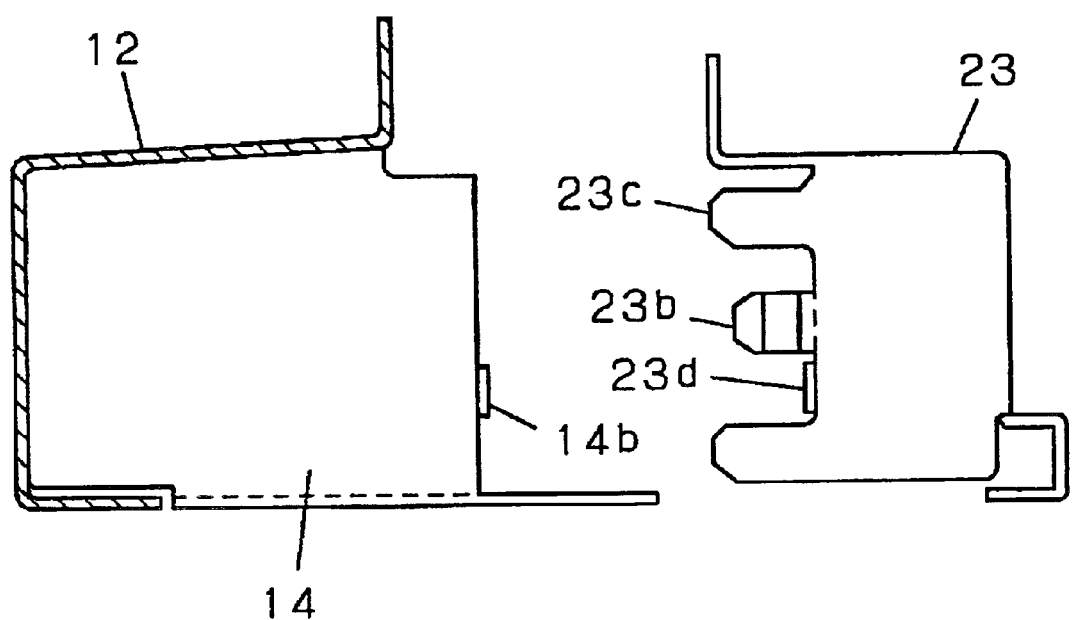
FIG. 27 is a side view before assembly of external shield component of the invention.

FIG. 26 shows a top sectional view and detailed view after assembly of external shield components, and FIG. 27 is a side view before assembly of external shield components.

A shield plate (rear) 23 forming the shield casing has a plurality of ungula-shape-portions 23b, protrusions 23a, and guides 23c on its outer circumference. In a shield plate (right) 14, the ungula-shape-portions 23b having protrusions 23a are inserted by snapping in, and by cutting off the metal surface film by force, the shield plate (right) 14 and shield plate (rear) 23 conduct electrically, and the shield casings securely conduct electrically. Thus, the shield casings are integrally linked. The screws 15 fix screw portions 14b and screw portions 23d.

The base metal bracket 12 and shield plate (rear) 23 are fixed by screws 15 as shown in FIG. 24. At this time, the shield plate (right) 14 is pressed to the base metal bracket 12, and the both conduct electrically.

The shield plate (left) 13 is similarly coupled to the base metal bracket 12 and shield plate (rear) 23, and conduct electrically. Thus, the shield casing, in which the base metal bracket 12, shield plate (rear) 23, shield plate (right) 14, and shield plate (left) 13 are integrally linked, is obtained.

The shape of the ungula-shape-portions 23b, protrusions 23a, and guides 23c is not limited to the shown shape. The mounting position on the shield plate (right) 14 by ungula-shape-portions is not specified. The shape and position of the screws 14b and screws 23d are arbitrary.

In this configuration, the shield plate (rear) 23, shield plate (right) 14, shield plate (left) 13, and base metal bracket 12 conduct securely with each other. At the same time, screw tightening portions for their coupling can be decreased in number. Thus, the shield casing is realized in a simple structure. When ungula-shape-portions 23b and guides 23c are disposed in multiple rows at predetermined intervals, intervals between electric grounding can be decreased. Therefore, the shield casing supplies a stable electric shield.

(Embodiment 12)

Figure 28:
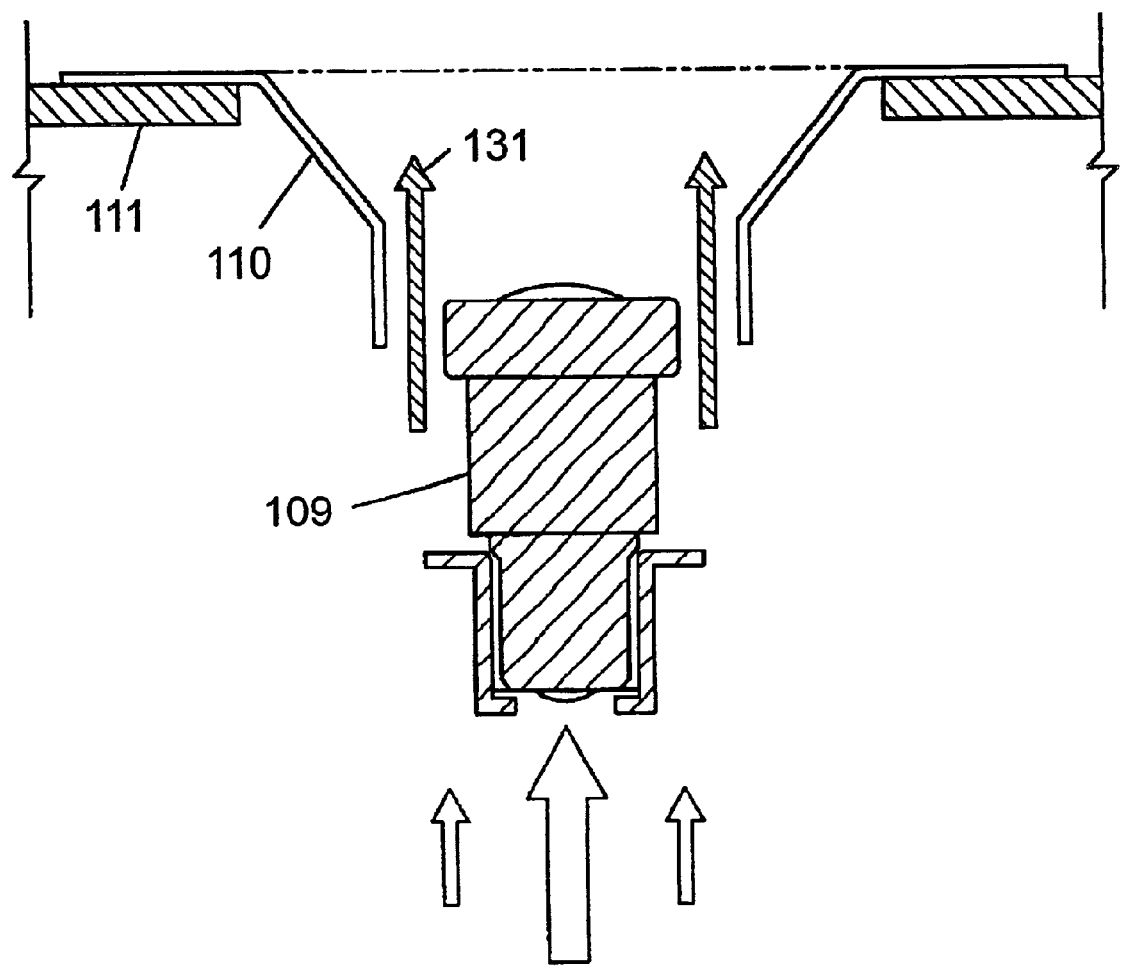
FIG. 28 shows undesired reflected light after assembly of projection lens and optical block in a prior art.
Figure 29:
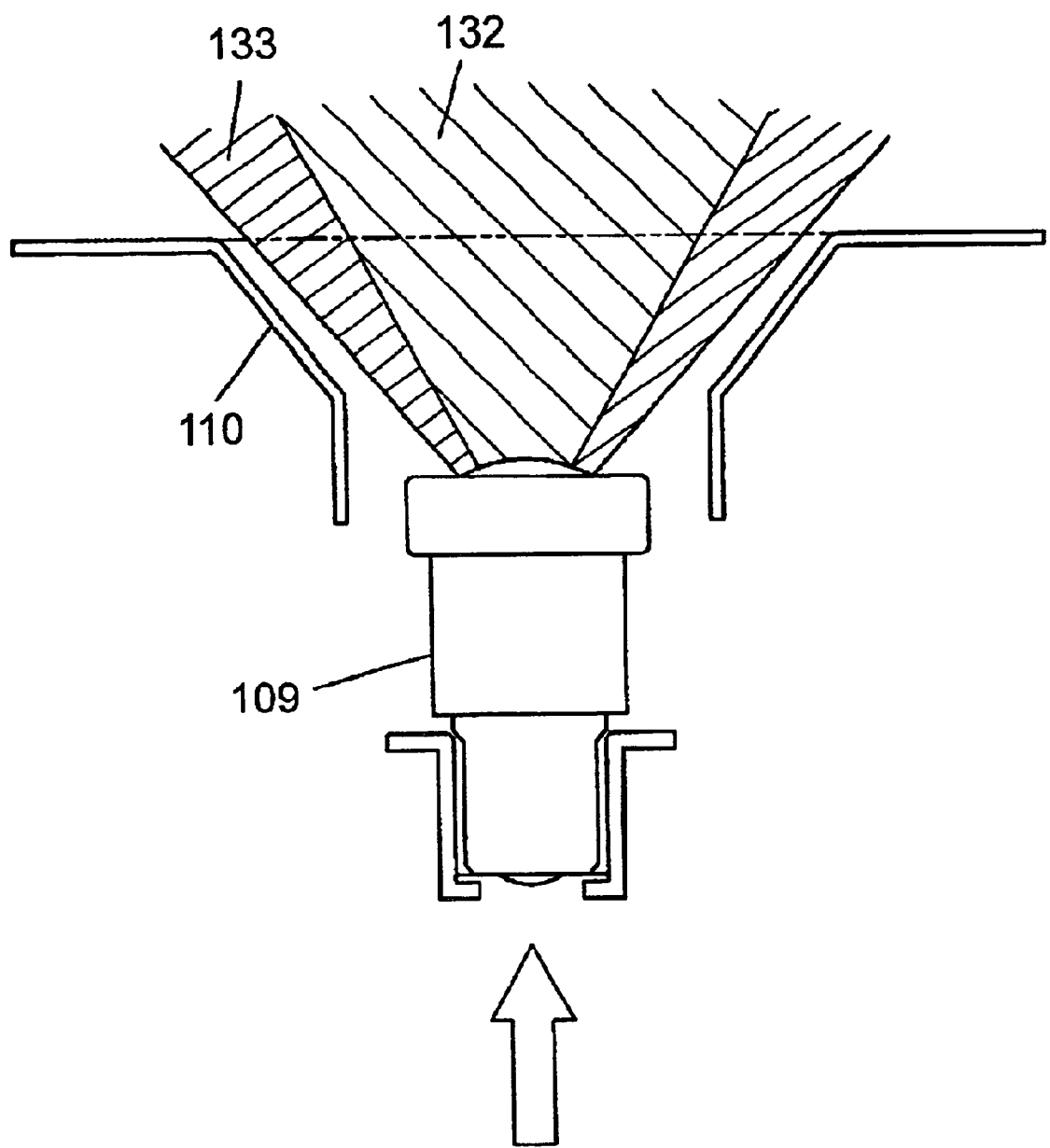
FIG. 29 shows effective light and undesired light after assembly of projection lens and optical block in a prior art.

FIG. 28 shows undesired reflected light after assembly of projection lens and optical block in a prior art, and FIG. 29 shows effective light and undesired light after assembly of projection lens and optical block in a prior art.

In the conventional optical block 111 shown in FIG. 28 and FIG. 29, the projection lens shield 110 has an open space for allowing the movable range of the projection lens 109 having movable mechanism. In this configuration, however, undesired reflected light 131 may leak out from the gap between the projection lens shield 110 and projection lens 109, and may be emitted to the screen to lower the picture quality. Besides, the undesired light emitted from the inside of the projection lens 109 may be also emitted to the screen to lower the picture quality.

As shown in FIG. 29, the projection lens 109 emits effective light 132 and undesired light 133 from the opening of the lens shield 110.

To solve these problems, hitherto, complicated works were required such as manual adhesion of non-woven cloth or subsequent mounting process of light shielding components.

Figure 30:
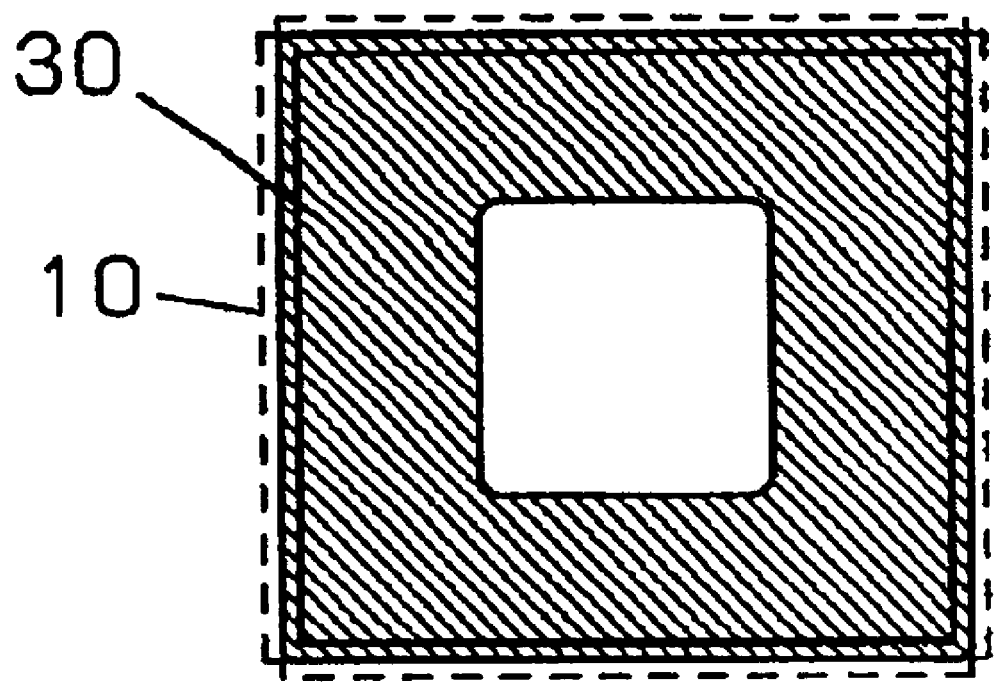
FIG. 30 is a top view of projection lens shield and light shielding screen of the invention.
Figure 31:
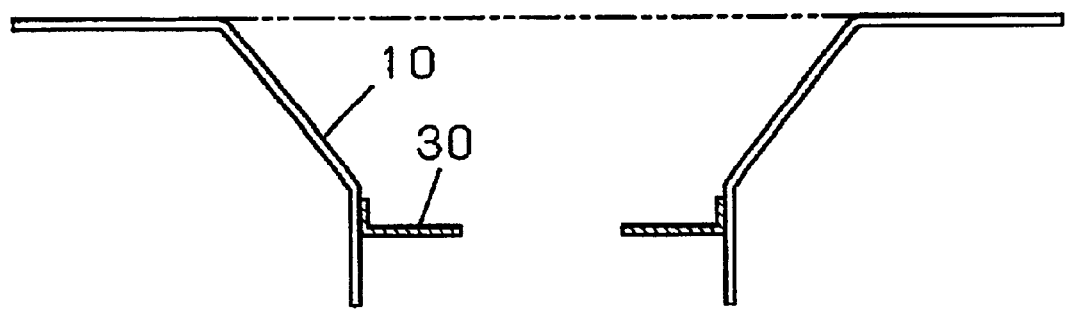
FIG. 31 is a side sectional view of projection lens shield and light shielding screen of the invention.
Figure 32:
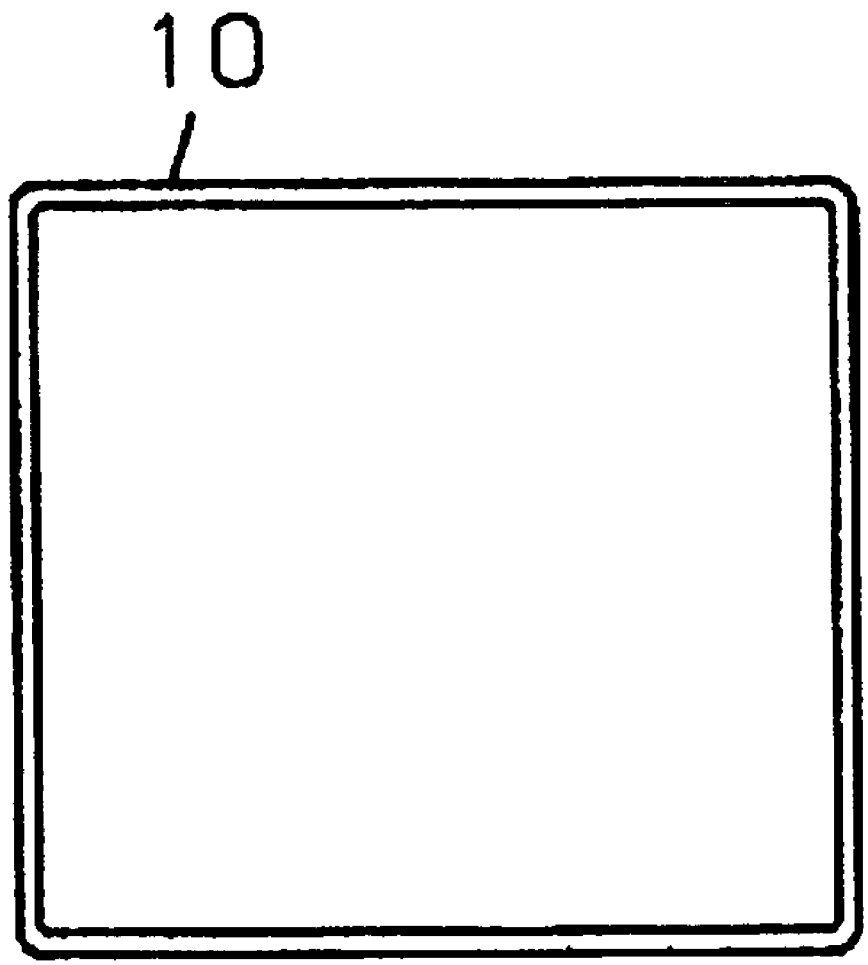
FIG. 32 is a bottom view of projection lens shield and light shielding screen of the invention.

FIG. 30, FIG. 31, and FIG. 32 show top view, side sectional view and bottom view of projection lens shield and light shielding screen of the invention.

Figure 33:
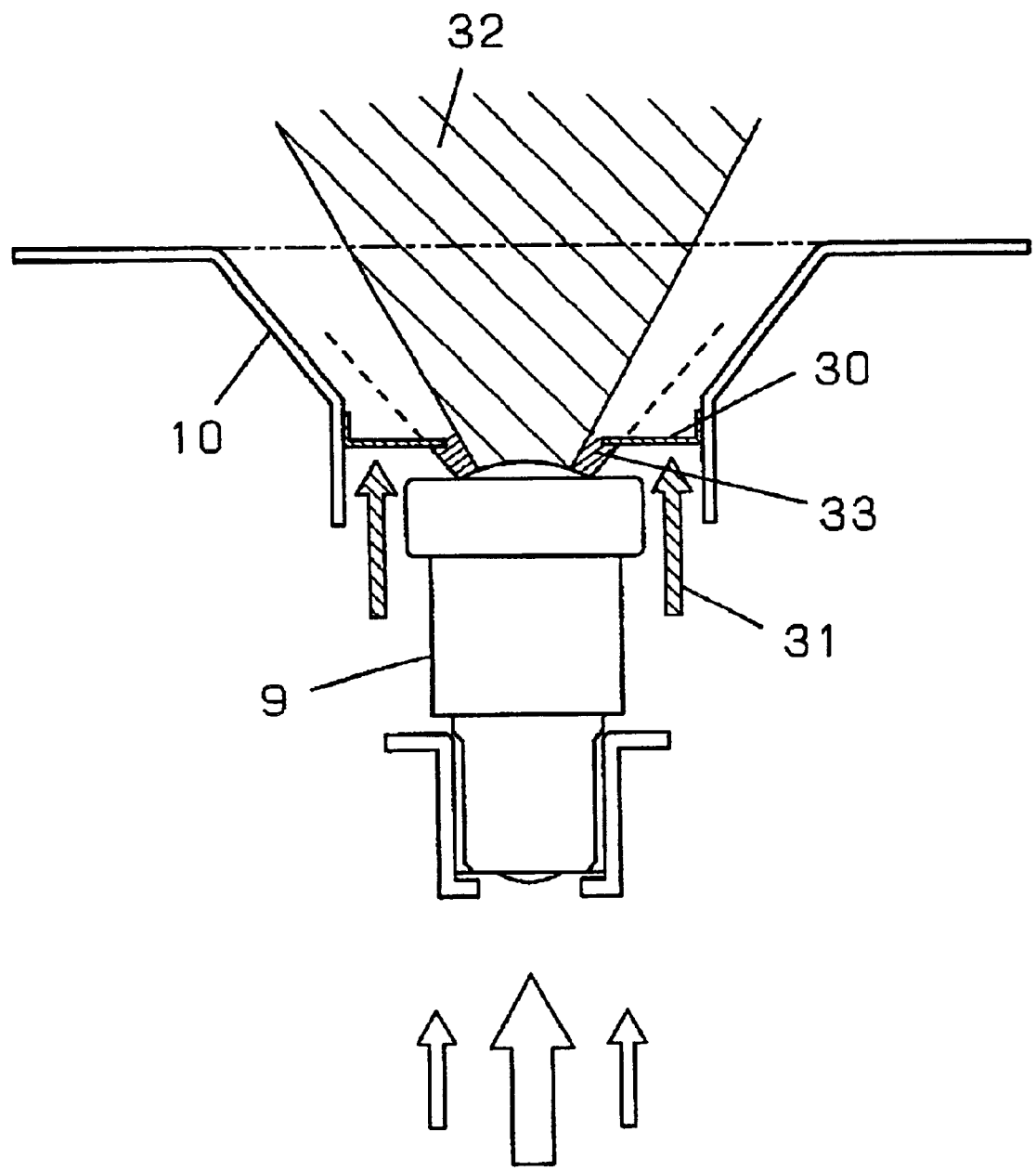
FIG. 33 is a side sectional view after assembly of projection lens shield of the invention.

FIG. 33 is a side sectional view after assembly of projection lens shield of the invention.

A light shielding screen 30 integrated with the projection lens shield 10 by crimping is disposed on the top of the projection lens 9. The light shielding screen 30 shuts off the undesired reflected light 31 emitted from the outer periphery of the projection lens and the undesired light 33 emitted from the inside of the projection lens. The shape and position of the projection lens shield 10 and light shielding screen 30 are not particularly specified. Herein, the light shielding screen 30 is disposed so as not to spoil the movable range of the projection lens 9. Method of mounting of the light shielding screen 30 on the projection lens shield 10 is not limited to crimping, but may include adhesion or other methods.

In this configuration, a simple light shielding structure without manual adhesion of non-woven cloth or subsequent mounting process of light shielding parts may be obtained. Further, the weight of the projection lens 9 or impact of falling or vibration may not be directly applied to the projection lens shield 10 or light shielding screen 30, so that it is excellent in mechanical strength and positional precision.

(Embodiment 13)

Figure 34:
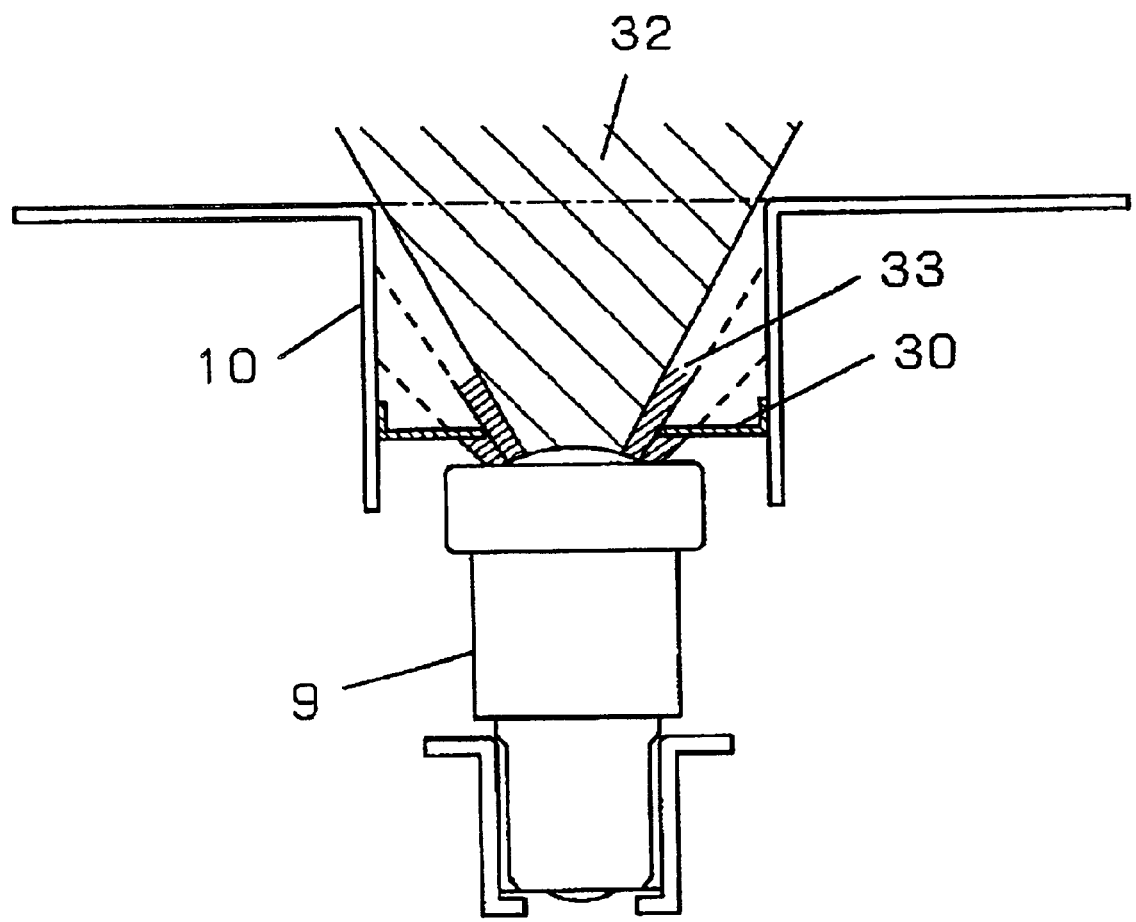
FIG. 34 is a side sectional view after assembly of projection lens shield of the invention.
Figure 35:
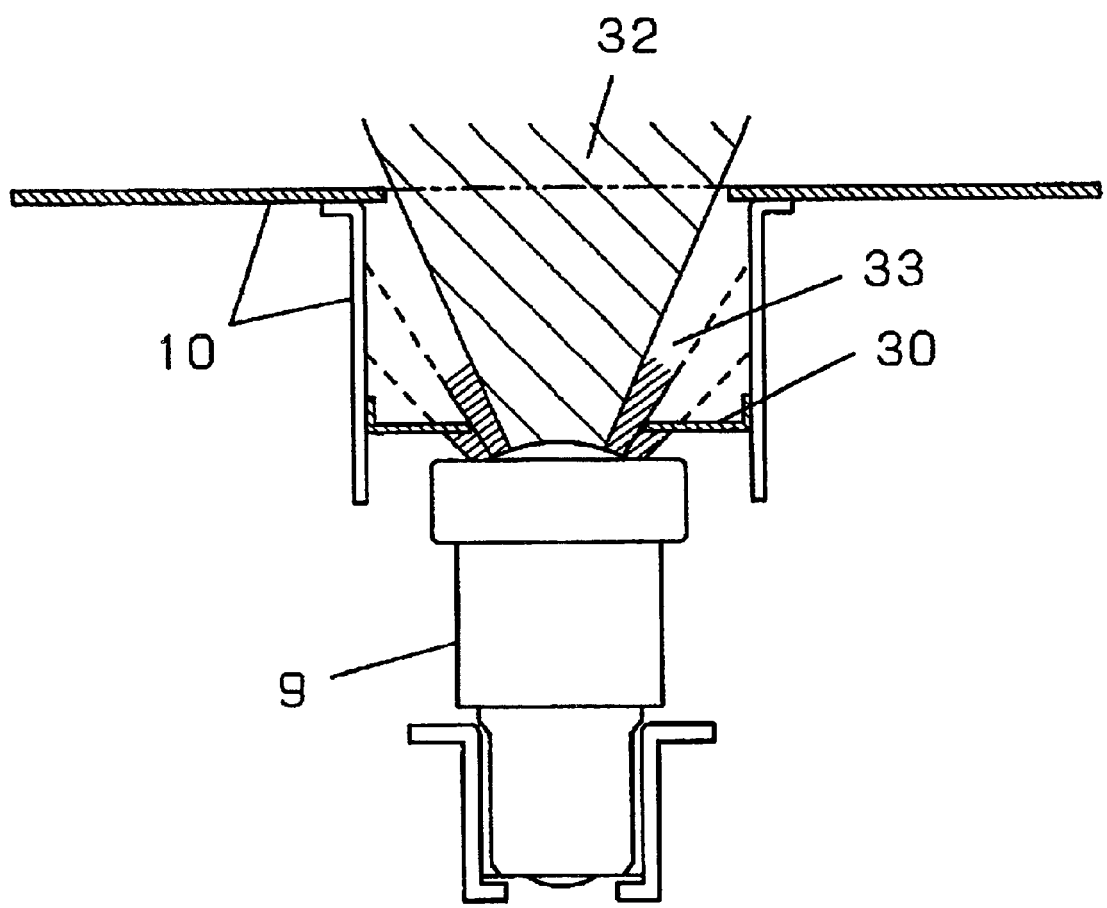
FIG. 35 is a side sectional view after assembly of projection lens shield of the invention.

FIG. 34 and FIG. 35 are side sectional views after assembly of projection lens shield in the embodiment of the invention.

The material and structure of the projection lens shield 10 and light shielding screen 30 in this embodiment are basically the same as in the preceding embodiment 12.

What differs from embodiment 12 is that the slope shape of the projection lens shield 10 is changed from the shape in FIG. 33 as shown in FIG. 34.

Herein, the light shielding screen 30 on the top of the projection lens 9 cuts off undesired light 33 emitted from the inside of the projection lens 9, and the projection lens shield 10 which is a structure integral with the light shielding screen cuts off a part of undesired light 33 not shielded by the light shielding screen 30.

That is, the undesired light emitted from the projection lens is cut off in double light shielding structures of the light shielding screen on the top of the projection lens and the structure integral with the light shielding screen. The structure of the projection lens shield 10 may be formed by adhering two parts as shown in FIG. 35.

In this configuration, the light shielding quantity and the light shielding precision are enhanced.

(Embodiment 14)

Figure 36:
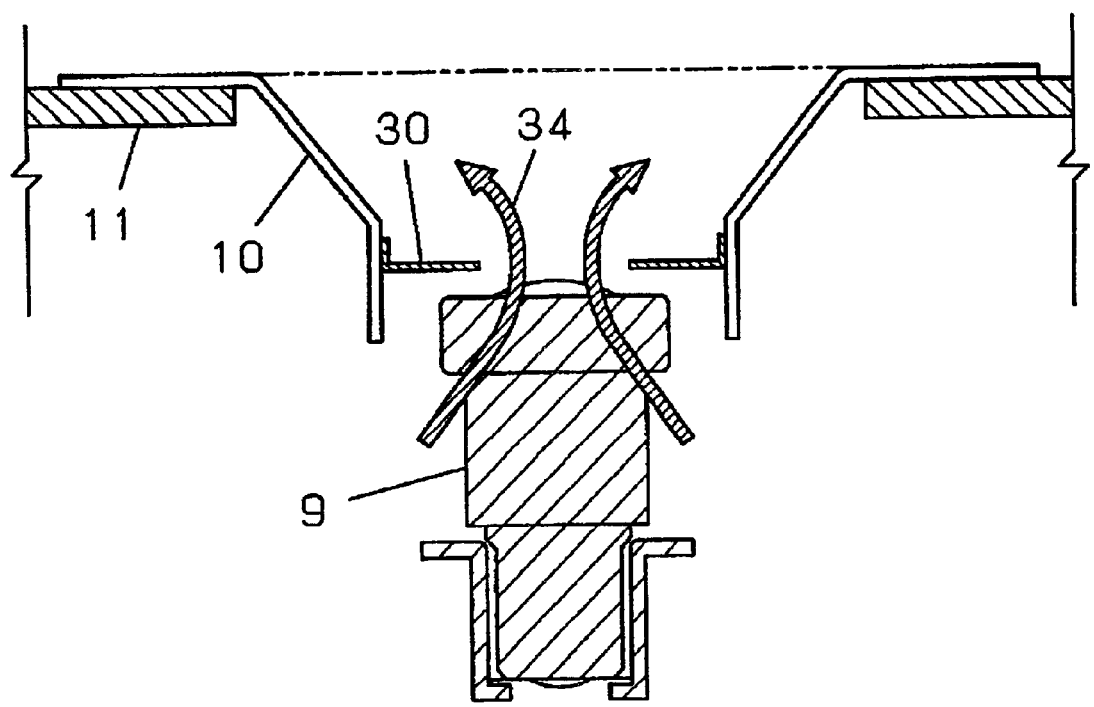
FIG. 36 shows undesired radiation after assembly of projection lens and optical block in a prior art.

FIG. 36 shows undesired radiation of electromagnetic wave after assembly of conventional projection lens and optical block.

The conventional projection lens shield 10 is disposed so as to keep a gap to the projection lens 9 in order to maintain the movable range of the projection lens 9 having a movable mechanism. However, in this configuration, undesired radiation 34 of electromagnetic wave may leak out from the gap between the projection lens shield 10 and projection lens 9, and a the shielding performance is lowered.

To solve these problems, hitherto, complicated works were required such as manual adhesion of conductive non-woven cloth or subsequent mounting process of conductive components.

Figure 37:
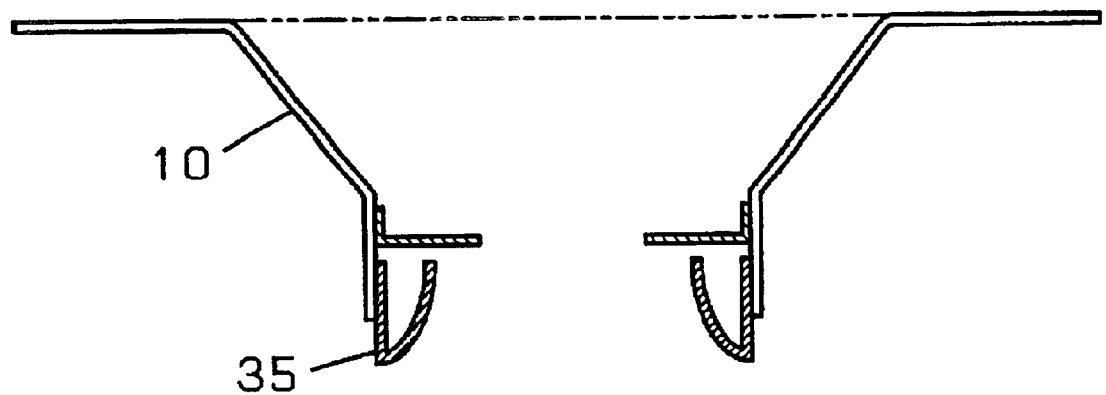
FIG. 37 is a side sectional view of projection lens shield and conductive spring of the invention.
Figure 38:
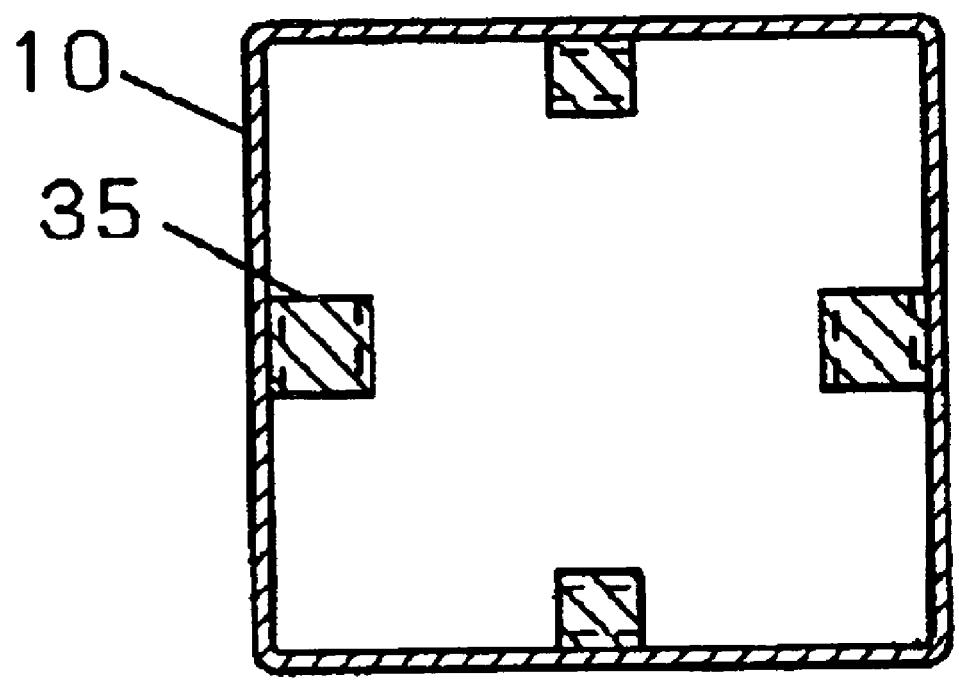
FIG. 38 is a bottom view of projection lens shield and conductive spring of the invention.

FIG. 37 and FIG. 38 show side sectional view and bottom view of projection lens shield and conductive spring of the invention.

Figure 39:
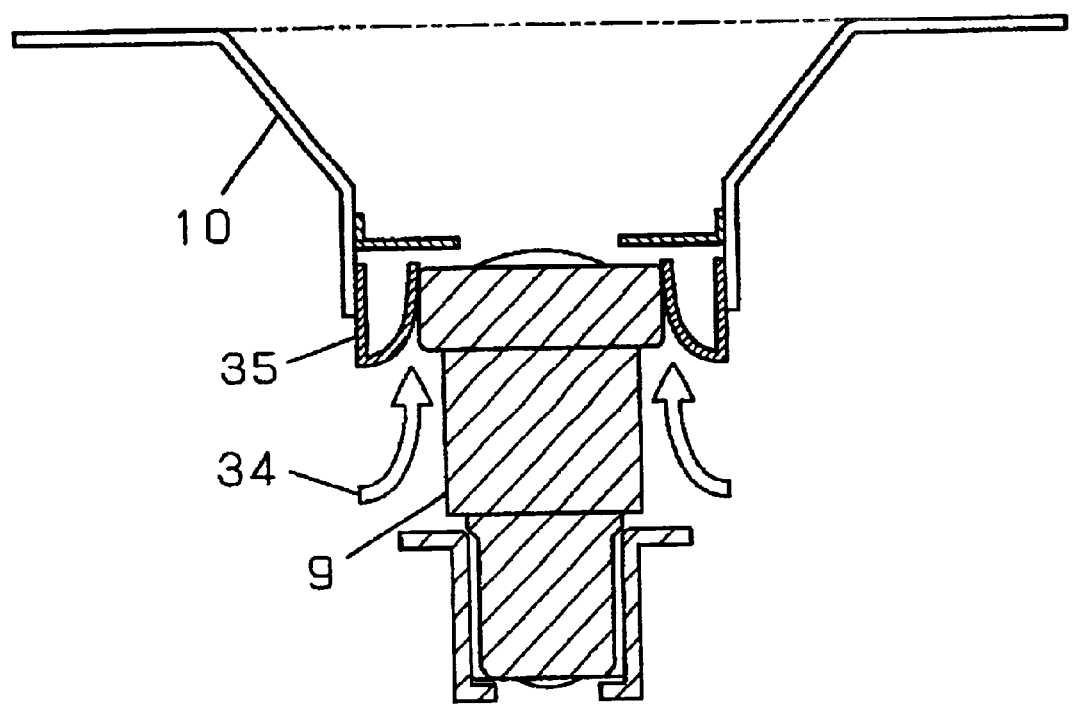
FIG. 39 is a side sectional view after assembly of projection lens shield of the invention.
Figure 40:
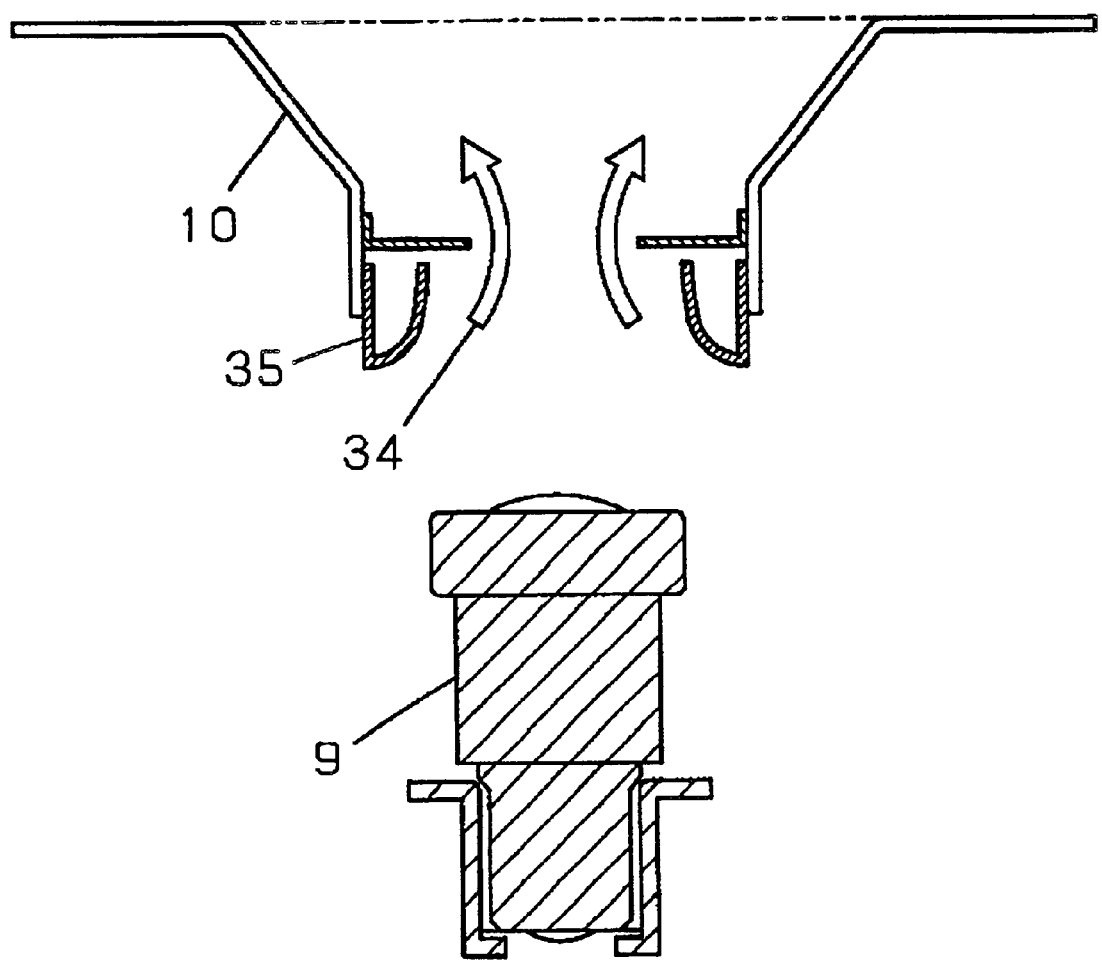
FIG. 40 is a side sectional view before assembly of projection lens shield of the invention.

FIG. 39 and FIG. 40 show side sectional view after and before assembly of projection lens shield of the invention.

As shown in FIG. 37 and FIG. 38, a conductive spring 35 is integrally fitted to the projection lens shield 10 by crimping.

As shown in FIG. 39, the conductive spring 35 integrated with the projection lens shield 10 by crimping is disposed on the top of the metal projection lens 9 so as to contact elastically and conduct electrically. As a result, undesired electromagnetic radiation 34 leaking out from the periphery of the projection lens can be cut off.

The shape and position of the projection lens shield 10 and conductive spring 35 are not particularly specified. The movable range of the conductive spring 35 allows the projection lens 9 to be movable while keeping electric contact with the spring 35. Method of mounting of the conductive spring 35 on the projection lens shield 10 is not limited, but may include adhesion, fusion or other methods.

In this configuration, a simple shielding structure of excellent shielding performance is obtained without requiring manual adhesion of conductive non-woven cloth or subsequent mounting process of conductive components. Further, the weight of the projection lens 9 or impact of falling or vibration is not directly applied to the projection lens shield 10, so that it is excellent in mechanical strength and positional precision.

(Embodiment 15)

Figure 41:
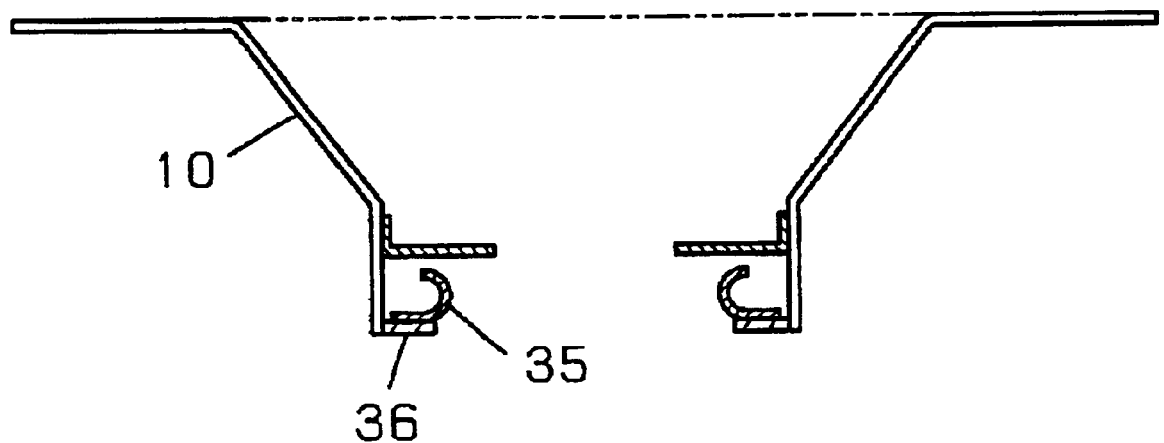
FIG. 41 is a side sectional view of projection lens shield and conductive spring of the invention.
Figure 42:
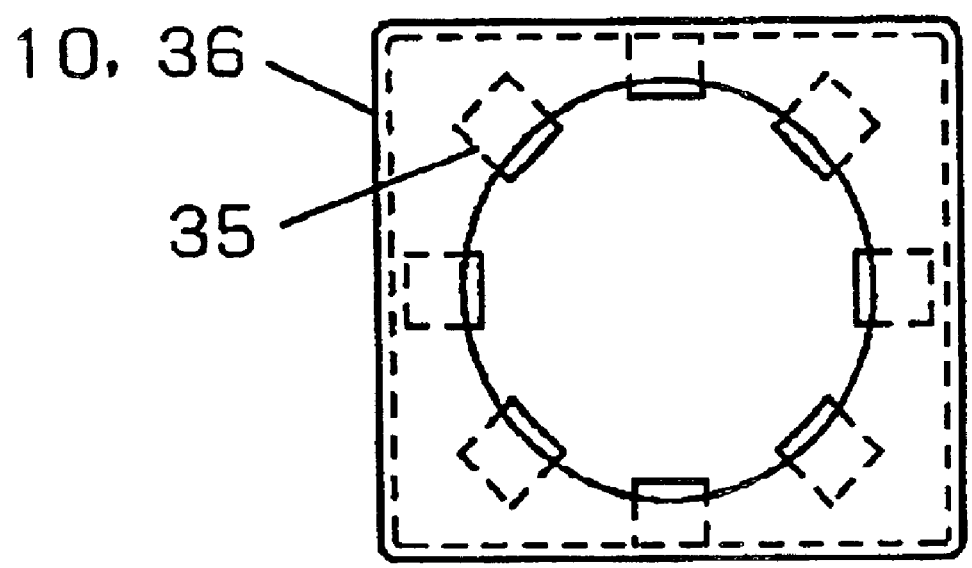
FIG. 42 is a bottom view of projection lens shield and conductive spring of the invention.

FIG. 41 and FIG. 42 show side sectional view and bottom view of projection lens shield and conductive spring of the invention.

Figure 43:
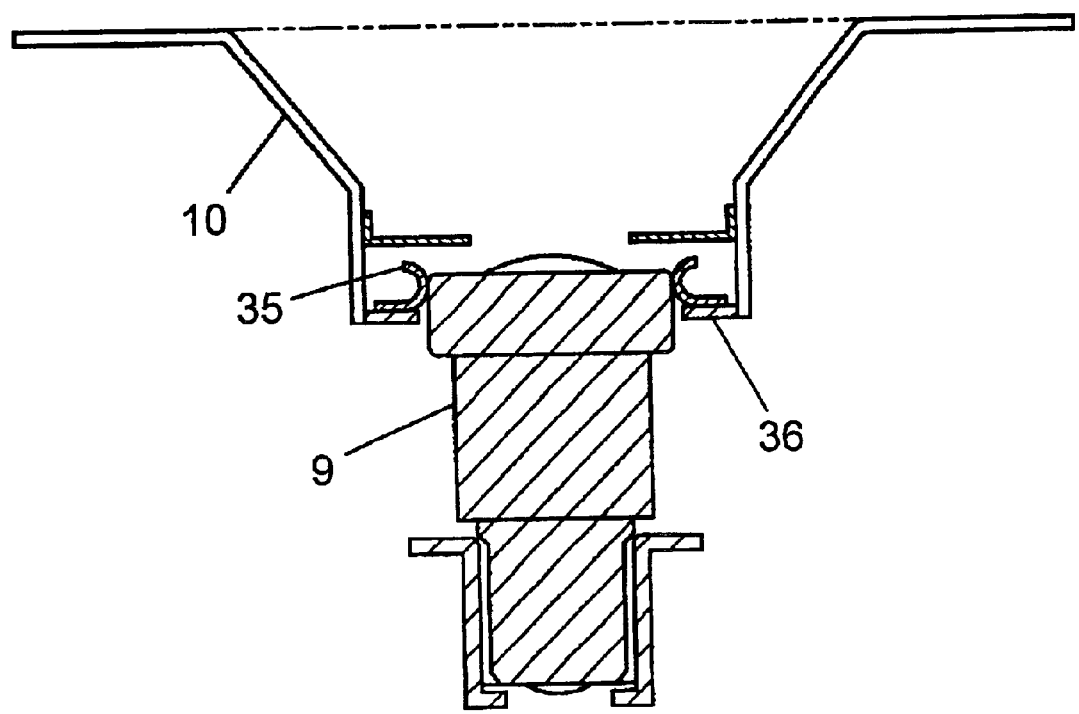
FIG. 43 is a side sectional view after assembly of projection lens shield of the invention.
Figure 44:
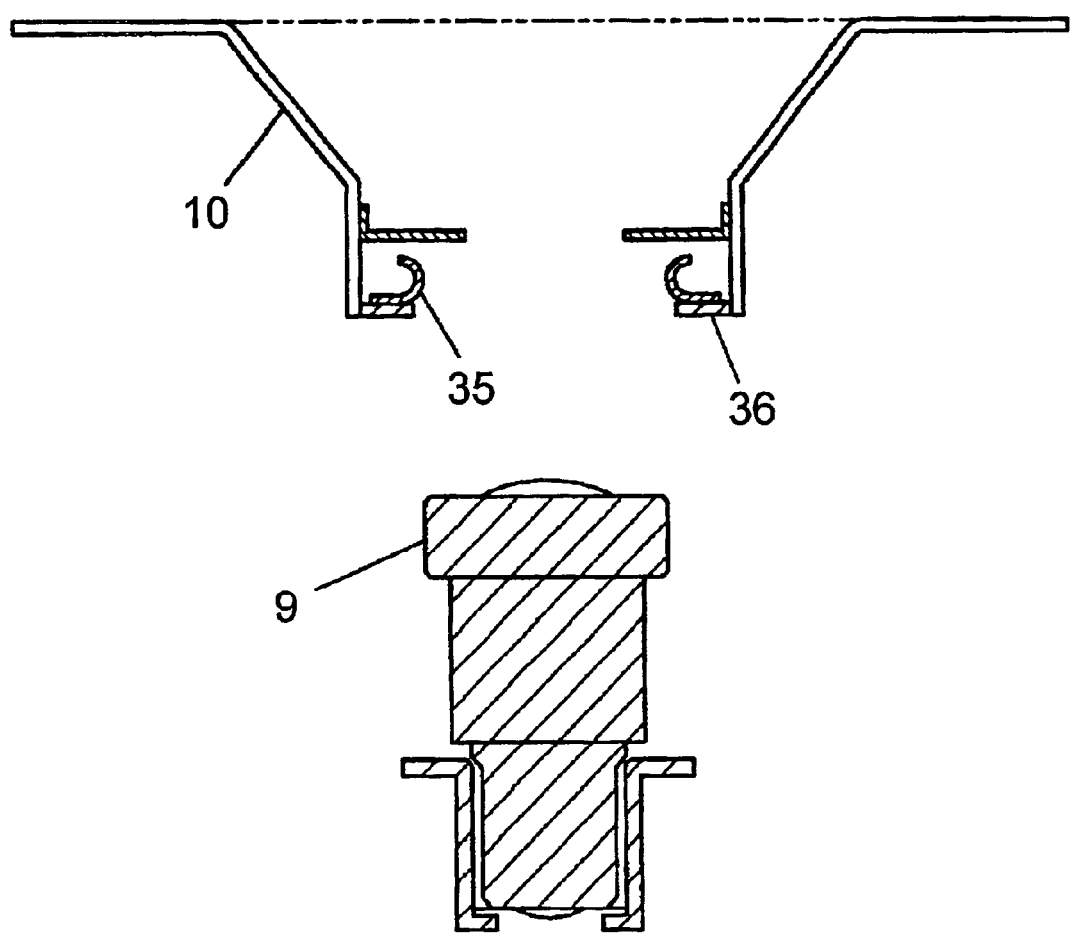
FIG. 44 is a side sectional view before assembly of projection lens shield of the invention.
Figure 45:
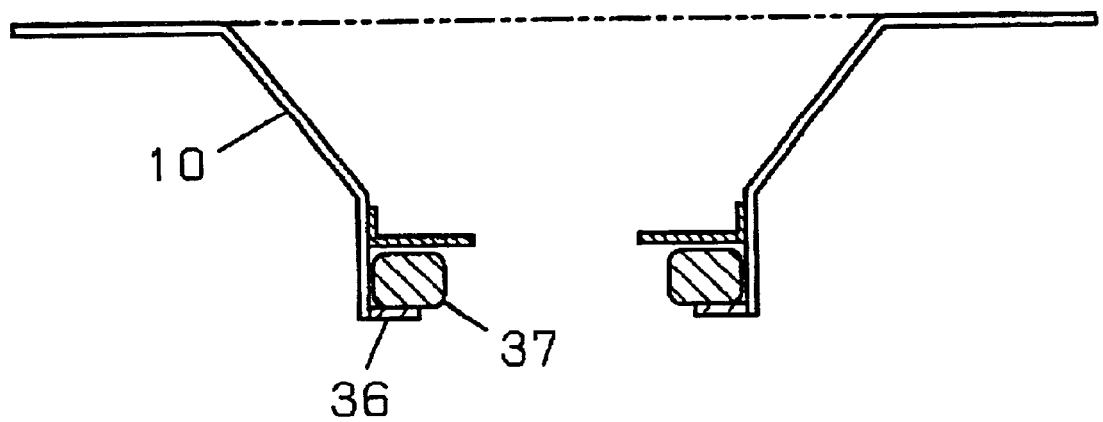
FIG. 45 is a side sectional view of projection lens shield and conductive gasket of the invention.

FIG. 43 and FIG. 44 show side sectional view after and before assembly of projection lens shield of the invention.

In this embodiment, the material and structure of the projection lens shield 10 and conductive spring 35 are basically the same as in the preceding embodiment 14.

What differs from embodiment 14 is that, as shown in FIG. 42, a plane 36 parallel to the projection lens surface is disposed on the projection lens shield 10, so as to increase the degree of freedom of mounting structure of the conductive spring 35. In this configuration, deformation of the conductive spring 35 can be prevented when inserting the projection lens 9 into the projection lens shield casing. It is also easy to increase the number of conductive springs 35. Therefore, the reliability and performance of shielding are further enhanced.

(Embodiment 16)

Figure 46:
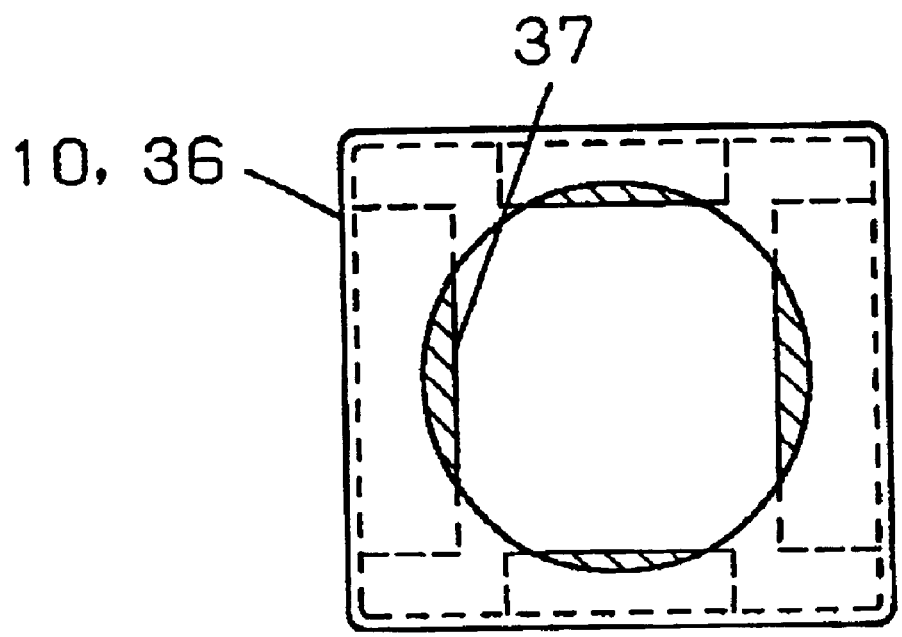
FIG. 46 is a bottom view of projection lens shield and conductive gasket of the invention.

FIG. 44 and FIG. 46 show side sectional view and bottom view of projection lens shield and conductive gasket of the invention.

Figure 47:
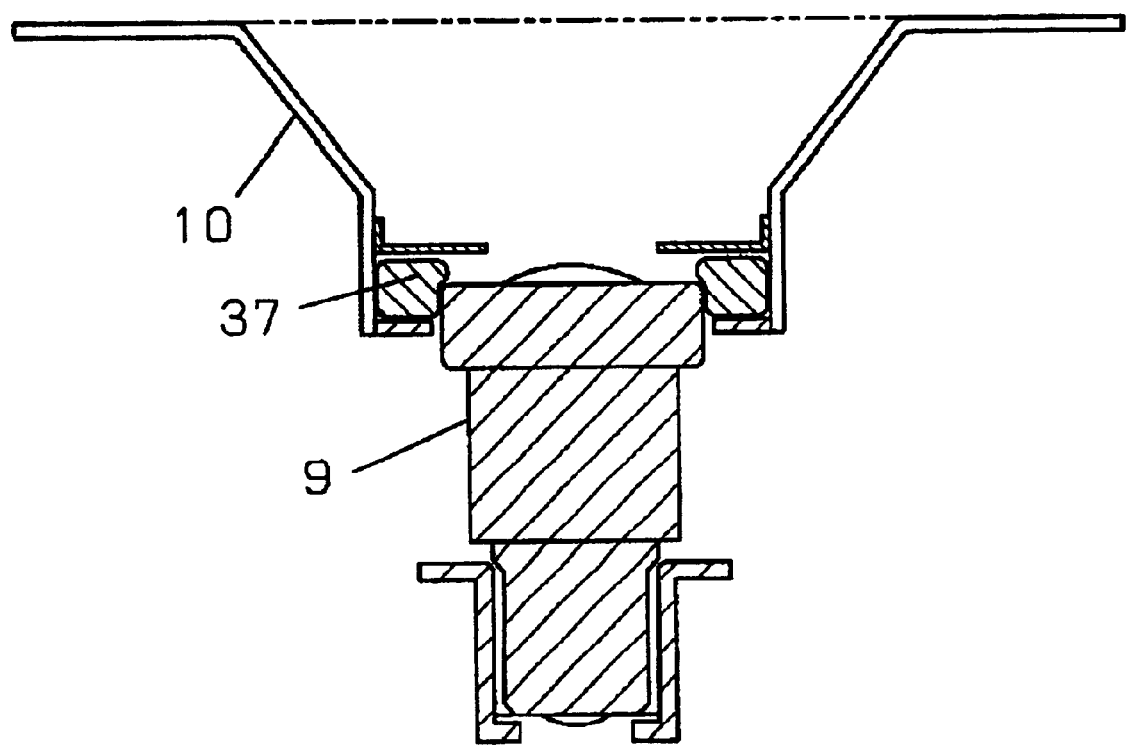
FIG. 47 is a side sectional view after assembly of projection lens shield of the invention.
Figure 48:
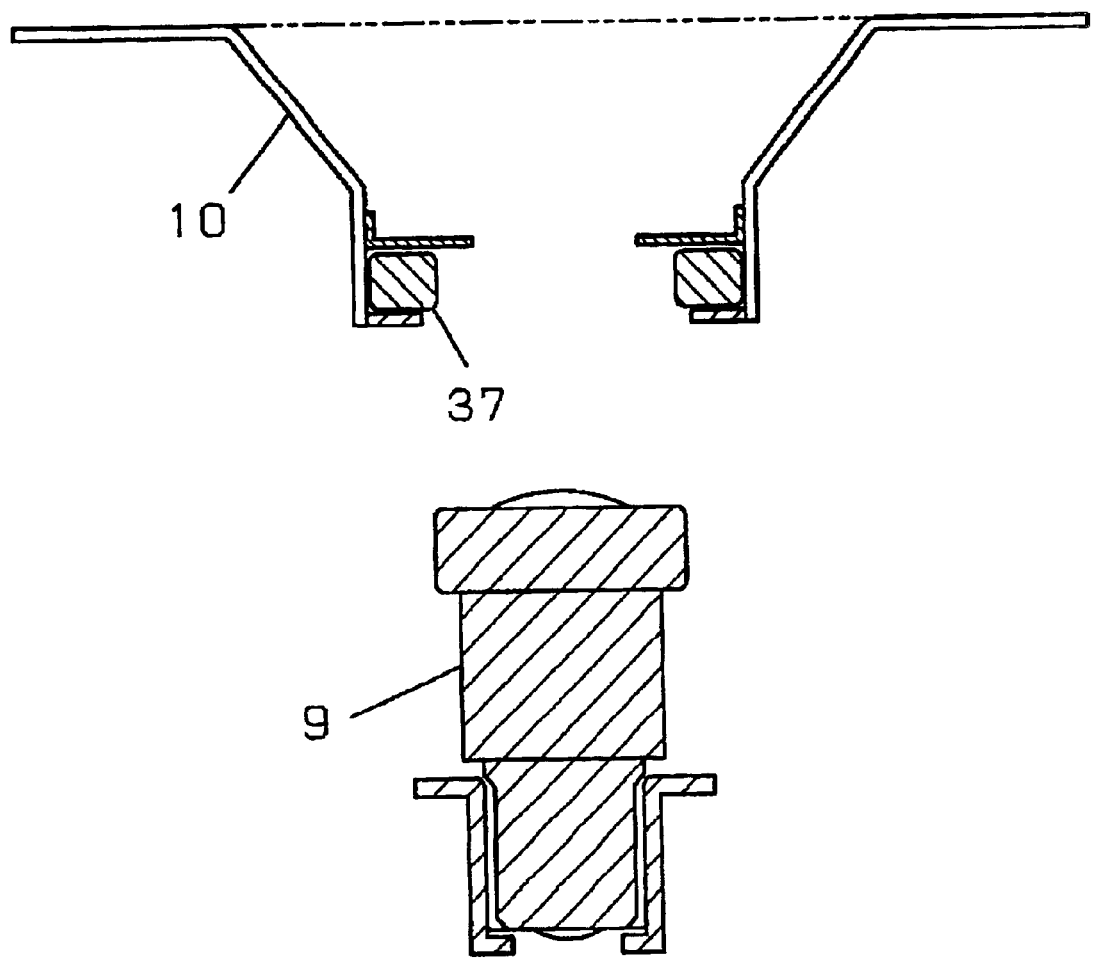
FIG. 48 is a side sectional view before assembly of projection lens shield of the invention.

FIG. 47 and FIG. 48 show side sectional view after and before assembly of projection lens shield of the invention.

In this embodiment, the material and structure of the projection lens shield 10 are basically the same as in the preceding embodiment 15.

What differs from embodiment 15 is that the conductive gasket 37 is used instead of the conductive spring 35. The same effects as in embodiment 15 are obtained.

Thus, the electric shield casing and optical shield casing of the invention are high in the degree of freedom of mounting without sacrificing the servicing merits.

Throughout the embodiments, the plate members used in electromagnetic shielding such as base metal bracket, shield plate, and chassis metal bracket are made of metal, and can be formed by plate working. Incidentally, when these members contain conductive members, the entire members may not be always made of metal.

What is claimed is:

1. A shielding apparatus of projection television containing an optical block, and a circuit block including a printed board on which electric circuit components are mounted, said shielding apparatus comprising:

a metal shield casing for accommodating and shielding said optical block and said circuit block, a printed board holding section detachably fixed to said metal shield casing for holding the printed board, and a connection section provided in the metal shield casing so as to snap in the printed board holding section and conduct electrically with it each other, wherein said printed board holding section are fixed to contact elastically with the metal shield casing through the connection section, and shield the optical block and circuit block.

2. The shielding apparatus of claim 1, wherein a ungula-shape-portion formed in the metal shield casing are inserted into a hole formed in the printed board holding section, and the printed board holding section snaps in the metal shield casing to be connected and fixed.

3. The shielding apparatus of claim 1, wherein the connection section included in a metal optical block holding section snaps in the printed board holding section, the metal optical block holding section conducts and connects with a metal casing of the printed board holding section, the metal optical block holding section forms a part of a shielding structure, and the optical block is detachably fixed in the metal shield casing by contacting elastically the metal shield casing.

4. The shielding apparatus of claim 1, wherein a screw for tightening at least one of the circuit block and the optical block to the metal shield casing is painted in a different color between a screw that needs to be removed at a time of servicing, and another screw not needed to be removed.

5. The shielding apparatus of claim 1, wherein another printed board holding section and the metal shield casing contact point by point with a protrusion formed in the another printed board holding section, and the another printed board holding section and the metal shield casing conduct with each other so as to enhance contact pressure.

6. The shielding apparatus of claim 1, wherein another printed board holding section and the metal shield casing contact with a conductive gasket formed in the another printed board holding section, and the another printed board holding section and the metal shield casing conduct with each other so as to enhance contact pressure.

7. The shielding apparatus of claim 1, wherein the optical block is disposed beneath an inside of a top of the metal shield casing, and the optical block is pressed to the metal shield casing by its own weight, and contacts and conducts with the metal shield casing.

8. The shielding apparatus of claim 1, wherein the metal shield casing contacts point by point with a protrusion formed in another printed board holding section, outside of the another metal printed board holding section, and the another metal printed board holding section and the metal shield casing conduct so as to enhance contact pressure mutually.

9. The shielding apparatus of claim 1, wherein the metal shield casing contacts with a conductive bend formed in another printed board holding section, outside of the another metal printed board holding section, and the another metal printed board holding section and the metal shield casing conduct so as to enhance contact pressure mutually.

10. The shielding apparatus of claim 1, wherein a conductive gasket formed in another printed board holding section contacts with the metal shield casing and the another metal printed board holding section simultaneously, and the another metal printed board holding section and the metal shield casing conduct so as to enhance contact pressure mutually.

11. The shielding apparatus of claim 1, wherein a metal shield section is disposed so as to contact with a resin-made cover component, and the metal shield section elastically contacts with the surface of the metal shield casing so as to shield electromagnetic waves passing through the resin-made cover component.

12. The shielding apparatus of claim 1, wherein a protrusion of a metal shield elastically contacts with the printed board holding section by way of a through-hole provided in the printed board, and cooling effect of the printed board is enhanced by thermal conduction between the printed board and the metal shield.

13. The shielding apparatus of claim 1, wherein a conductive spring device is provided in a shield disposed in the optical block so that a metal casing of a projection lens included in the optical block may be movable, and electromagnetic undesired radiation generated in a gap between the optical block and the shield disposed in the optical block is cut off.

14. The shielding apparatus of claim 1, wherein a spring device contacting with a projection lens casing when the projection lens casing is inserted into the spring device, is provided in a flat plane provided in the optical block.

15. The shielding apparatus of claim 1, wherein a conductive gasket contacting with a projection lens casing when the projection lens casing is inserted into the gasket, is provided in a flat plane provided in the optical block.

* * * * *